US008875029B1

(12) United States Patent
Naidu

(10) Patent No.: US 8,875,029 B1
(45) Date of Patent: Oct. 28, 2014

(54) ACTIVE MAIL THREAD

(75) Inventor: Siddartha Naidu, Seattle, WA (US)

(73) Assignee: Google Inc., Mountain View, CA (US)

( * ) Notice: Subject to any disclaimer, the term of this patent is extended or adjusted under 35 U.S.C. 154(b) by 368 days.

(21) Appl. No.: 12/857,396

(22) Filed: Aug. 16, 2010

(51) Int. Cl.
G06Q 10/10 (2012.01)

(52) U.S. Cl.
USPC .......................................................... 715/752

(58) Field of Classification Search
USPC .................................. 715/751, 750, 752, 736
See application file for complete search history.

(56) References Cited

U.S. PATENT DOCUMENTS

| 5,568,540 | A | 10/1996 | Greco et al. | |
|---|---|---|---|---|
| 7,243,125 | B2 | 7/2007 | Newman et al. | 709/206 |
| 7,487,216 | B2 | 2/2009 | Miller et al. | |
| 7,565,347 | B2 | 7/2009 | Broder et al. | 707/6 |
| 7,583,205 | B2 | 9/2009 | Fux et al. | |
| 8,214,746 | B2* | 7/2012 | Hamilton et al. | 715/751 |
| 2001/0042103 | A1 | 11/2001 | Tomari et al. | |
| 2002/0073157 | A1 | 6/2002 | Newman et al. | 709/206 |
| 2002/0184317 | A1 | 12/2002 | Thankachan | 709/206 |
| 2004/0039778 | A1 | 2/2004 | Read et al. | |
| 2005/0050474 | A1 | 3/2005 | Bells et al. | |
| 2005/0188320 | A1 | 8/2005 | Bocking | |
| 2005/0223066 | A1 | 10/2005 | Buchheit et al. | |
| 2006/0005133 | A1 | 1/2006 | Lyle et al. | |
| 2007/0174490 | A1 | 7/2007 | Choi et al. | |
| 2007/0180407 | A1 | 8/2007 | Vahtola | |
| 2008/0005668 | A1 | 1/2008 | Mavinkurve et al. | 715/526 |
| 2008/0098078 | A1* | 4/2008 | Daniell | 709/206 |
| 2008/0281927 | A1* | 11/2008 | Vanderwende et al. | 709/206 |
| 2008/0294730 | A1 | 11/2008 | Oral et al. | |
| 2010/0198927 | A1* | 8/2010 | Tonnison et al. | 709/206 |
| 2011/0060994 | A1* | 3/2011 | Maxwell et al. | 715/730 |
| 2011/0179362 | A1* | 7/2011 | Craddock et al. | 715/752 |

FOREIGN PATENT DOCUMENTS

EP 1327940 A1 7/2003 .............. G06F 17/30

* cited by examiner

Primary Examiner — William Bashore
Assistant Examiner — Jeanette J Parker
(74) Attorney, Agent, or Firm — Morgan, Lewis & Bockius LLP

(57) ABSTRACT

A computer-implemented method includes, on a client system, receiving an email message that is a part of an email thread. The received email message includes gadget instructions and associated gadget data. In response to user selection of the received email message, updated gadget data is obtained and the gadget instructions are executed. Also in response to user selection of the received email message, an instance of a gadget associated with the gadget instructions in the email message is displayed in the client application. The displayed gadget is updated to reflect the obtained updated gadget data.

16 Claims, 15 Drawing Sheets

Example
Container API
200

Read interface
201

Read interface:
- GetNumMessages(): int
- GetMessage(i: int): Message, where ←— 203
    Message {
        headers: dictionary,
        root: application data DOM element root
    }
- GetPreferences(): dictionary (app level user preferences)
- GetThreadPreferences(): dictionary (per thread preferences)
                                                            204

Saving thread state:
- SaveState(state: dictionary)
- LoadState(): dictionary          Write interface
                                        205
Write interface:
- PostUpdate(update: string, plain_text: string): bool (sent)
                                                            206

ACTIVE MAIL THREAD

TECHNICAL FIELD

The present invention relates generally to providing information to computer users and more specifically to executing gadgets from email threads.

BACKGROUND

Many applications such as, calendar applications, voting applications, task list applications, gaming applications and package tracking applications are available on websites. Typically, a user has to login to the website hosting the application to access the application. It is inconvenient and time consuming for a user to visit and login to a website each time the user desires to access a particular application.

It is also difficult and inconvenient for users to collaborate with other users on websites that host standalone applications. The users who wish to collaborate with each other must maintain user accounts at the same website. This may make it difficult for the users to collaborate because some users may not want to go through the trouble of signing up for an account and some users may disagree on which website to use. The users who do not have an account will not be able to participate in the collaboration or even see useful information from the collaboration. For example, users without a user account at a website hosting a voting application would not be able to vote, see the voting options or see the result of the vote on the website. Users who have an account at a respective website and wish to collaborate with other users must take the time to locate the other users and verify the identities of the other users. For example, in a voting application, users must have some way of verifying that only authorized users are voting otherwise the voting result may be untrustworthy.

Websites that host applications may not provide a user with a record of a collaboration. Many websites may periodically delete the record to save resources or may only make the record available to a subset of users who were involved in the collaboration. For example, only the user who created a vote may have a record of the vote results. The record of the collaboration, depending on the website, may also be presented in many different ways and with varying degrees of detail. Some websites may not allow the record to be easily exported and thus when the website shuts down the record is lost.

Email is a widely used form of communication and collaboration. Accordingly, it would be highly desirable to have a way to have a user's email mailbox be a container for applications.

SUMMARY

The above deficiencies and other problems associated with web applications are reduced or eliminated by the disclosed method and devices. In accordance with some embodiments, a system and method are provided for an email application that executes gadgets stored in email messages. The email application acts as a container for executing gadget applications contained in email messages. When an email message of an email thread is opened, the container application detects and aggregates gadget data from one or more messages in the message thread. The gadget is executed and the executing gadget accesses the aggregated gadget data. The executing gadget displays an output with the aggregated gadget data. The executing gadget may be interactive and accept user input. Updated gadget data is sent in an email message to other users in the message thread. Such methods allow a user to access applications from their email application instead of having to visit and login to websites hosting applications. Such methods also allow users who do not have email applications capable of executing gadgets to receive useful information from the gadgets. Such methods further provide users with a complete record of the collaboration. Such methods also allow users to quickly and easily collaborate with other users.

A computer-implemented method is executed on a client system having one or more processors and memory storing programs executed by the one or more processors. The client system is connected to a server system through a network and manages a client application. The method includes receiving an email message that is a part of an email thread. The received email message includes gadget instructions and associated gadget data. The method includes obtaining updated gadget data in response to user selection of the received email message. The method also includes executing gadget instructions in response to user selection of the received email message. The response to user selection also includes displaying in the client application an instance of the gadget associated with the gadget instructions in the email message. The response to user selection furthermore includes updating the displayed gadget to reflect the obtained updated gadget data.

According to some embodiments, a computer-implemented method for inserting a gadget into an email message is executed on a client system having one or more processors and memory storing programs executed by the one or more processors. The client system is connected to a server system through a network and manages a client application. The method includes displaying a message composition interface for composing a message. The interface includes a gadget insertion option. The method also includes, in response to user selection of the gadget insertion option, sending a request to a server system for a list of gadgets, receiving the list of gadgets and displaying the received list of gadgets. The method further includes, in response to user selection of a respective gadget of the list of displayed gadgets, inserting instructions corresponding to the selected gadget and corresponding gadget data into the composed message.

BRIEF DESCRIPTION OF THE DRAWINGS

FIG. 2A illustrates an exemplary API.

FIGS. 3A-1, 3A-2, 3A-3, 3A-4, 3B-1 and 3B-2 are flow chart diagrams illustrating processes of executing and inserting gadgets into messages.

FIG. 4 is an exemplary screenshot of an output of a gadget according to some embodiments of the invention.

DESCRIPTION OF EMBODIMENTS

Figure 1:
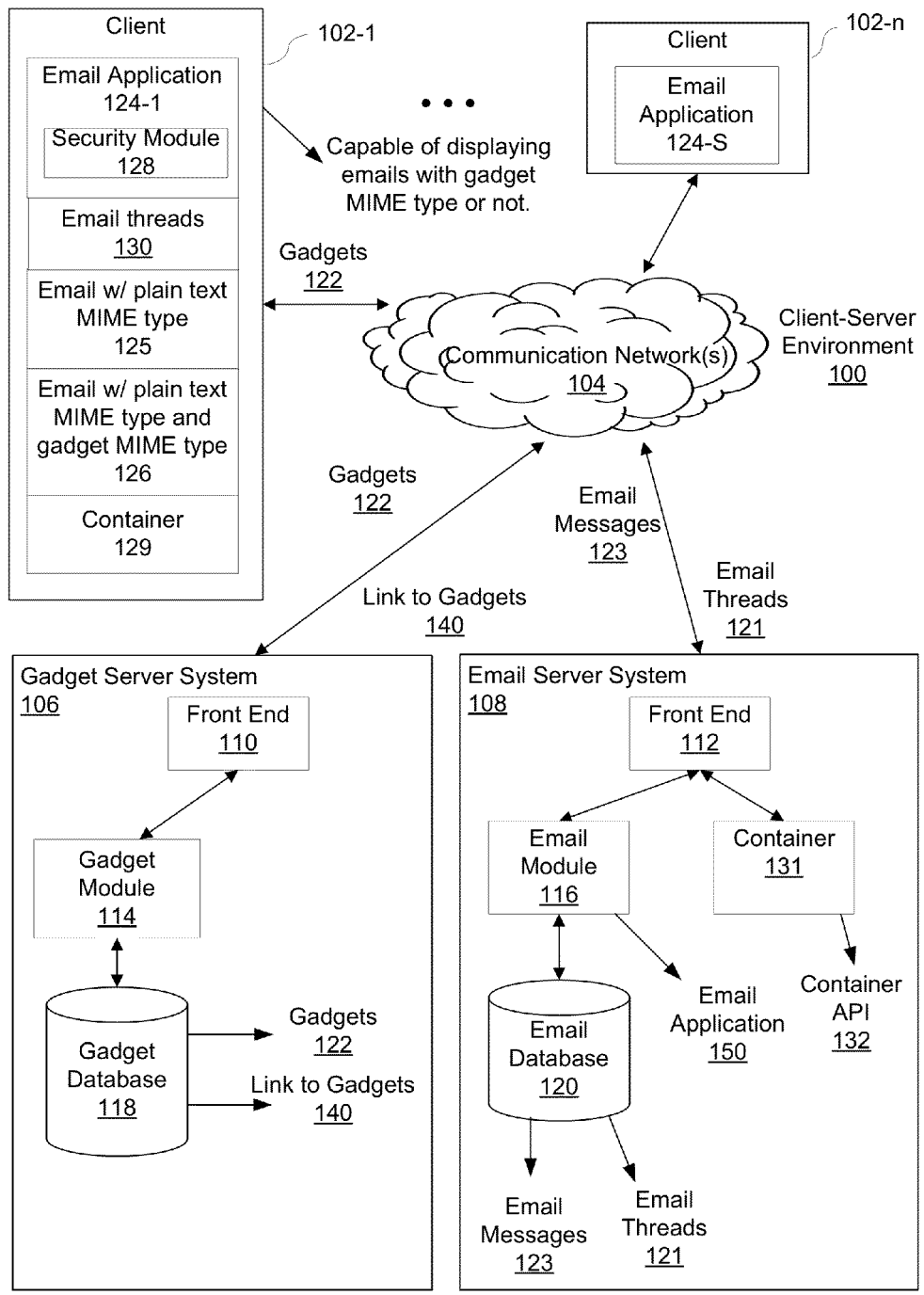
FIG. 1 are block diagrams illustrating the infrastructure of a client-server environment in accordance with some embodiments of the invention.

Methods and systems for active mail threads are described. Reference will be made to certain embodiments of the invention, examples of which are illustrated in the accompanying drawings. While the invention will be described in conjunction with the embodiments, it will be understood that it is not intended to limit the invention to these particular embodiments alone. On the contrary, the invention is intended to cover alternatives, modifications and equivalents that are within the spirit and scope of the invention as defined by the appended claims.

Moreover, in the following description, numerous specific details are set forth to provide a thorough understanding of the present invention. However, it will be apparent to one of ordinary skill in the art that the invention may be practiced without these particular details. In other instances, methods, procedures, components, and networks that are well known to those of ordinary skill in the art are not described in detail to avoid obscuring aspects of the present invention.

In some embodiments, a gadget is an application or computer program that is executed in an environment that manages multiple gadgets. Stated in another way, a gadget is an application that provides services without needing its own independent application to be launched, and instead is executed by an application that manages multiple gadgets. In other words, a gadget is an application that is executed in a container application, such as a mail application, that supports the execution of gadgets. A container, as discussed in further detail below, includes an API (application programming interface) that allows a gadget to instruct the container to perform various functions. For example, a gadget may issue one or more commands to the container to read gadget data from one or more messages in a message thread. In some embodiments, a gadget is an application that uses gadget data encoded in portions of one or more email messages as a gadget MIME type. In some embodiments, a gadget is a java script application that is executed on a client system. The gadget may be written in JavaScript™ (a trademark of Sun Microsystems, Inc.), ECMAScript (the specification for which is published by the European Computer Manufacturers Association International), VBScript™ (a trademark of Microsoft, Inc.) and/or any other client-side scripting language. In other words, gadgets include programs or procedures containing JavaScript, ECMAScript instructions, VBScript instructions, or instructions in another programming language suitable for rendering by the browser or another client application. In some embodiments, the container inserts gadget instructions and gadget data into an email message encoded as a gadget MIME type. In some embodiments, a gadget is a shared task list, a calendar scheduling application, a board game, a live meeting agenda, an invention application and a shipment tracker.

A MIME or multipurpose internet mail extension is a communication protocol for transmission of data in various forms such as text, images, sounds, video and programs. MIME allows files such as images, sounds, video and programs to be transported via e-mail. Mapping messages into and out of MIME format is typically done automatically by an email client or by mail servers. The MIME protocol defines a collection of e-mail headers for specifying the content type and attribute of messages. The MIME protocol allows for the creation of new content types and other MIME attribute values.

As used herein, a gadget MIME type is a custom protocol for the transmission of gadgets and gadget data via e-mail messages. It is noted that only client applications that are capable of reading gadget MIME types can recognize and execute gadgets from email messages that include gadget code and gadget data encoded as a gadget MIME type.

FIG. 1 is a block diagram illustrating the infrastructure of a client-server environment 100 for implementing some of the embodiments of the invention. The client-server environment 100 includes: one or more client devices 102, a communication network 104, a gadget server system 106 and an email server system 108. The gadget server system 106 and email server system 108 are coupled to the one or more client devices 102 by a communication network 104.

It should be appreciated that the gadget server 106 and the email server 108 may be implemented as a single server or a distributed system of multiple computers. However, for convenience of explanation, the gadget server system 106 and email server system 108 are described below as being implemented on separate computers.

The communication network(s) 104 can be any wired or wireless local area network (LAN) and/or wide area network (WAN), such as an intranet, an extranet, or the Internet. It is sufficient that the communication network 104 provides communication capability between the client devices 102, the gadget server system 106, and the email server system 108. In some embodiments, the communication network 104 uses the HyperText Transport Protocol (HTTP) to transport information using the Transmission Control Protocol/Internet Protocol (TCP/IP). HTTP permits client devices 102 to access various resources available via the communication network 104. The various embodiments of the invention, however, are not limited to the use of any particular protocol.

In some embodiments, the gadget server system 106 includes a front end 110, a gadget module 114 and a gadget database 118. In some embodiments, the gadget server system 106 sends, receives and executes gadgets.

The front end 110 provides an interface between the gadget server system 106 the client devices 102 and the email server system 108. In some embodiments, the front end 110 is configured to receive gadgets 122. In some embodiments, the front end 110 is configured to receive requests for one or more gadgets 122 and to send one or more gadgets 122 or a link to a gadget 140 to the client devices 102 or the email server system 108.

The gadget database 118 stores gadgets 122. In some embodiments, the gadget database 118 includes multiple gadget databases 118, or the gadget database 118 is partitioned, with each partition or database storing gadgets corresponding to categories of gadgets. For example, all gadgets relating to games could be stored in a partition or database. In some embodiments, the gadget database 118 stores an instance ID and/or a gadget ID for each gadget in the gadget database. In some embodiments, the gadget database 118 stores links to respective gadgets 140. The gadget ID identifies the gadget and the instance ID identifies the particular instance of the gadget. In some embodiments, the instance ID includes information that identifies when the gadget was first used.

The gadget module 114 maintains at least some of the gadgets 122 in the gadget database 118. In some embodiments, the gadget module 114 assigns instance IDs and gadget IDs to gadgets. In some embodiments, the gadget module 114 responds to a request for a gadget by returning a link to the gadget 140. In some embodiments, the gadget module 118 responds to a request for a gadget by returning the instructions corresponding to the gadget 122.

In some embodiments, the email server system 106 includes a front end 112, an email module 116, an email database 120 and a container 131. In some embodiments, the email server system 108 receives requests for email messages 120 or email threads 121 from the client devices 102 or the gadget server system 106 and returns emails 120 or email threads 121. The email server system 106 also receives and stores emails 120 and email threads 121 in the email database 120.

The email database 120 stores email threads 121 and email messages 123. In some embodiments, the email database 118 includes multiple email databases 120, or the email database 120 is partitioned, with each partition or database storing email messages 123 and email threads 121. In some embodiments, the email messages 123 and the messages belonging to the email threads 121 include a section containing content encoded as a plain text MIME type and section containing content encoded as a gadget MIME type. In some embodiments, the section containing content encoded as a gadget MIME type includes instructions corresponding to a gadget application and gadget data. In some embodiments, each message in an email thread 121 is given a thread ID that identifies the messages as belonging to a respective thread.

The email module 116 maintains at least some of the email messages 123 and email threads 121 in the email database 120. In some embodiments, the email module 116 assigns a thread ID to an email messages in a thread of messages. In some embodiments, the email module 116 sends instructions to a client corresponding to an email application 150. The email application 150 allows a user to draft, send and receive e-mails. In some embodiments, the email application 150 is a web-based application that a user can use a web browser to access. In some embodiments, the email application 150 is a mail-client application. A mail-client application should be distinguished from a web-based email application. Although e-mail communication can be performed with a web browser, the web browser is actually used to access the mail-client application, and not a web-based application. In some embodiments, the email module 116 inserts gadget instructions and gadget data into an email message encoded as a gadget MIME type. In some embodiments, the email application 150 inserts gadget instructions and gadget data into an email message encoded as a gadget MIME type.

Figure 2B:
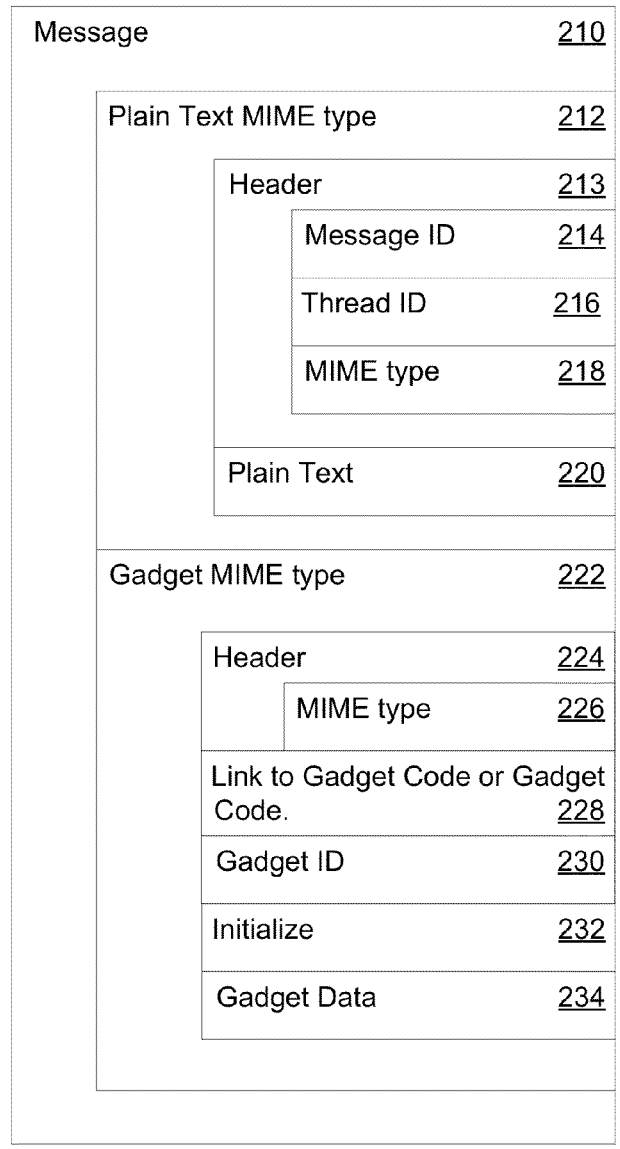
FIG. 2B illustrates a block diagram of an email message.
Figure 2C:
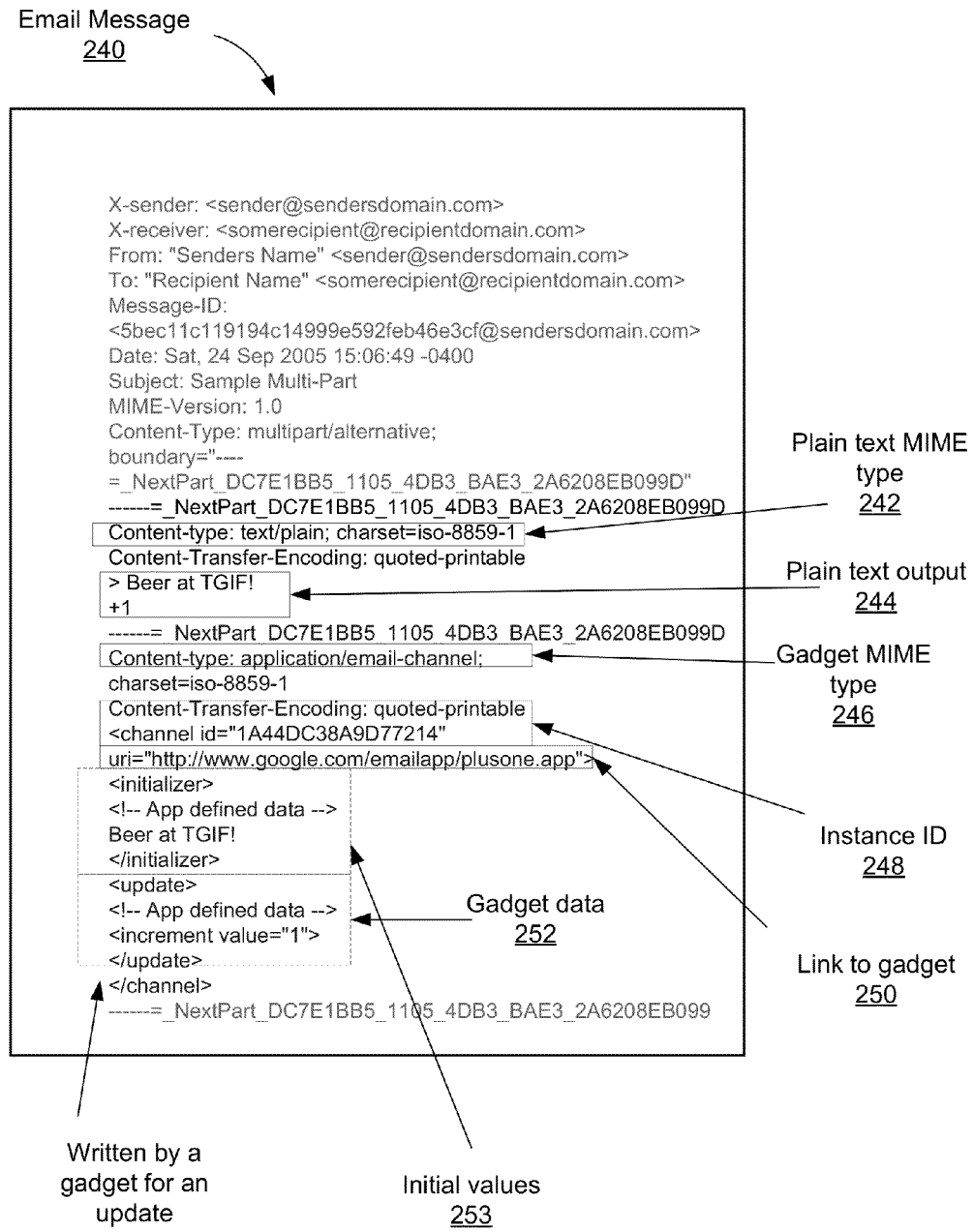
FIG. 2C illustrates an exemplary email message.
Figure 2D:
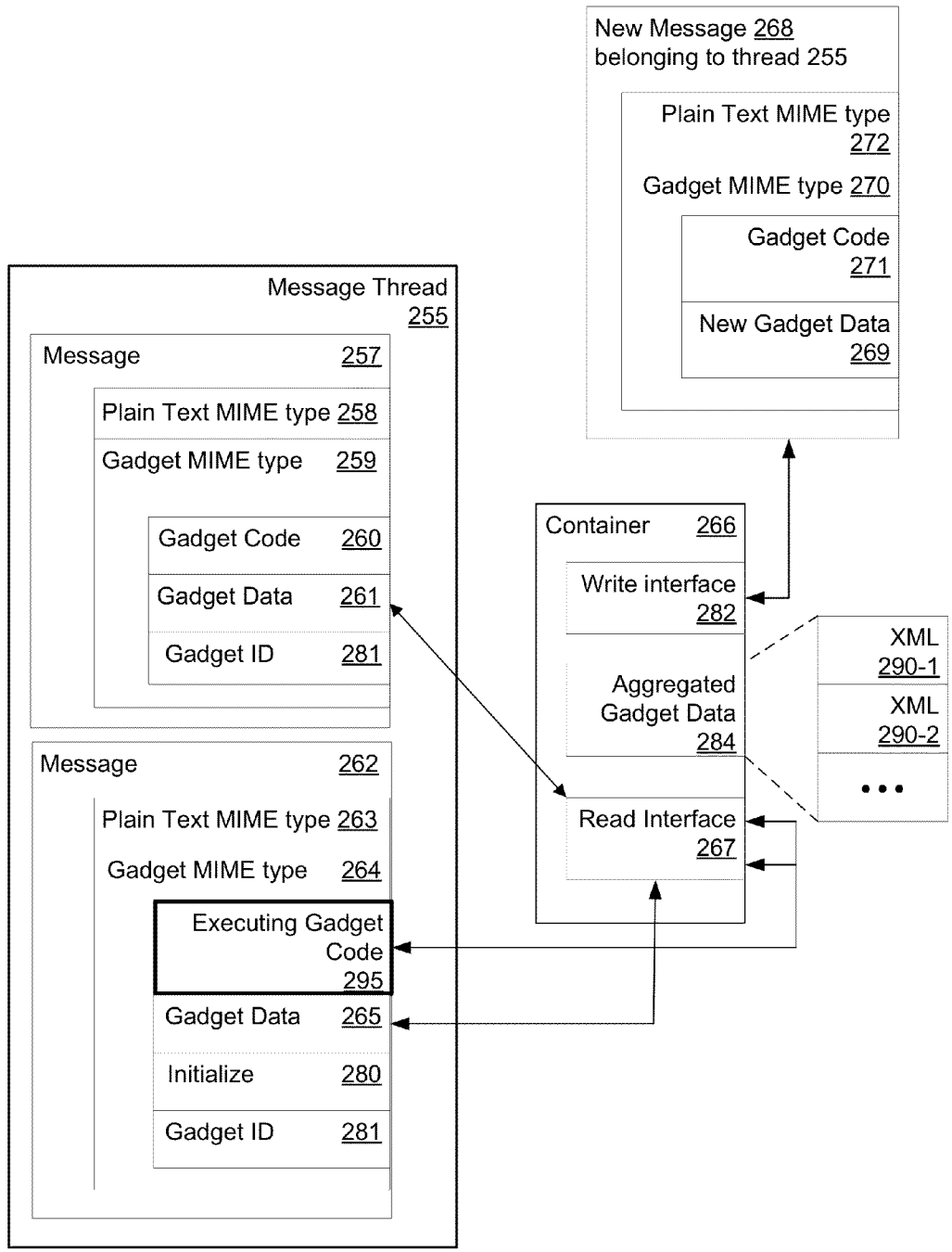
FIG. 2D is a block diagram illustrating an exemplary data flow between the container and a message thread.

Emails messages 123 and Email threads 121 are discussed in greater detail in the discussion of FIG. 2B, FIG. 2C and FIG. 2D.

The container 131 is a module or application that provides an environment for gadgets to be executed in and performs various tasks on behalf of a gadget. The container 131 includes a container API 132 (application programming interface) that defines a library of functions that a gadget can call to instruct the container 131 to perform various tasks. The container API 132 is discussed in greater detail in the discussion of FIG. 2A. The container 131 executes gadgets, retrieves gadget code from a remotely located server, gathers gadget data from remotely located servers, gathers gadget data from one or more messages in a message thread, constructs new email messages, encodes gadget data and gadget code as a gadget MIME type, inserts gadget data and gadget code into email messages as a gadget MIME type and sends email messages.

In some embodiments, the container 131 retrieves and executes gadgets from the gadget server system 106. In some embodiments, the container 130 retrieves and executes gadgets located in an email message 123 or email thread 121. In some embodiments, the execution of the gadget includes displaying user interface elements. The container 131 accepts function calls and commands from an executing gadget. The function calls and commands are defined by a container API 132. The container API 132 is discussed in greater detail in the discussion of FIG. 2A.

The container 131 is responsible for gathering gadget data. In some embodiments, the container 131 gathers gadget data from email messages 123 and email threads 121 contained in the email database 120. For example, the container API could include functions to read message, write messages, get messages, get number of message, get thread ids, get user gadget preferences, get thread preferences, to save states, to load states and to post updates. As discussed further herein, the container 131 extracts gadget data from plain text and/or gadget MIME type portions of email messages. Stated in another way, the container 131 reads gadgets data from a portion of an email message encoded as gadget MIME type and/or from a portion of an email message encoded as a plain text MIME type. In some embodiments, the container 131 retrieves gadget data from non-email sources that are remotely located from the server system 108. For example, the container 131 could query a server for a stock price, for a document, for directions or for movie times.

The container 131 encodes and inserts gadget data into email messages. In some embodiments, the container 131 creates new email messages and inserts gadget instructions and gadget data into an email message encoded as a gadget MIME type. In some embodiments, the container 131 sends a new email message or instructs another application to send the new email message.

In some embodiments, the container 131 is an application (e.g., javascript) embedded within a frame or iframe. In some embodiments, the container 131 is sent to the client devices 102 when the client devices 102 request an email message 123 or an email thread 121. In some embodiments, the container 131 is embedded in the email application 150. In some embodiments, the container 131 is sent to a client 102 in response to a client request for the container 131.

A user interfaces with the gadget server system 106 and the email server system at a client device 102. The client devices 102 may be any suitable computer devices that are capable of connecting to the communication network 104, such as computers, desktop computers, laptop computers, tablet devices, netbooks, internet kiosks, personal digital assistants, mobile phones, gaming devices, or any other device that is capable of receiving emails from the email server system 106. The client devices 102 typically include one or more processors, non-volatile memory such as a hard disk drive and a display. The client devices 102 may also have input devices such as a keyboard and a mouse (not shown).

In some embodiments, the client device 102 includes an email application 124-1, email threads 130, email with content encoded as a plain text MIME type, email with content encoded as a plain text MIME type and content encoded as a gadget MIME type, and a container 129.

A respective client 102 may contain at least one email application 124 for composing, receiving, viewing email messages and executing gadgets. The email application 124 is software application that permits a user to interact with the clients 102 and/or network resources such as the gadget server system 106 and email server system 108 to perform one or more tasks. In some embodiments, the email application 124 is a web application that is accessed by a web browser. The browser application can be any browser (e.g., Google Chrome) or other type of application that permits a user to search for, browse, and/or use resources (e.g., web pages and web services) identified by a URL (universal resource locator). Similarly, the term "URL" means a network address or location of a document. In this context, the term "document" means any document or content of any format including, but not limited to, text, image, audio, video, etc., that may be used by a web browser or other applications. In some embodiments, the email application 124 is a stand alone client application.

In some embodiments, the email application 124 inserts gadget instructions and gadget data into an email message encoded as a gadget MIME type.

In some embodiments, the email application 124 includes a security module 128 for determining which gadgets can be executed. For example, the security module 128 could ensure that only user authorized gadgets, gadgets from certain domains or that only gadgets in emails received from users in the recipient's address book can be executed. Further security criteria for gadget execution is discussed in the discussion of FIG. 3A-2.

In some embodiments, a client 102 includes threads of emails 130, email messages 125 with content encoded as a plain text MIME type and emails messages 126 containing both content encoded as a plain text MIME type and content encoded as a gadget MIME type. Email messages with content encoded as a gadget MIME type is discussed further herein.

In some embodiments, the user client 102 includes a container 129. The container 129 provides an environment for the applications to be executed in and performs various functions for an executing gadget. The container 129 includes a container API (application programming interface) that defines a library of functions that a gadget can call to instruct the container 129 to perform various tasks. The container API is discussed in greater detail in the discussion of FIG. 2A. The container 129 performs similar functions as those described with respect to container 131. The container 129 executes gadgets, retrieves gadget code from a remotely located server, gathers gadget data from remotely located servers, gathers gadget data from one or more messages in a message thread, constructs new email messages, encodes gadget data and gadget code as a gadget MIME type, inserts gadget data and gadget code into email messages as a gadget MIME type and sends email messages.

In some embodiments, the container 129 is included in the email application 124. In some embodiments, the container 129 is a separate application and the email application 124 invokes the container application 129. In some embodiments, the container 129 is a plug-in that is installed on the email application 124 or a web browser. In some embodiments, the email application 124 does not include or invoke a container and thus is not able to execute gadgets. In some embodiments, the container 129 is executed when a user views an email containing a gadget MIME type.

Executing gadgets from an email container provides many advantages to email users. An email mailbox provides a convenient location for the execution of gadgets. A user can save time by not having to visit multiple websites for applications. In addition, a user does not need to sign up for user accounts at websites that host applications.

Executing gadgets from an email container also facilitates collaboration among users. Email is a widely used and trusted form of communication. A user can easily find and communicate with other users. The user can also know, based on past email messages, the identity of the people they are collaborating with. In addition, users who use email clients that are not capable of executing gadgets are capable of viewing useful information generated by gadgets. Thus, the information generated from a collaboration that uses gadgets can be easily disbursed to a great number of users.

Many users may want a record of a collaboration for future reference. Storing gadgets and gadget data in email messages ensures that each user of a thread retains a complete record of a collaboration. Storing gadgets and gadget data in email messages also enables a user to easily retrieve gadget information through the use of email search functions.

Email providers also benefit from gadget execution from email messages by providing more features to users at a relatively low cost. Users who perform more functions from within an email application are more likely to use and store information on the email system.

Attention is now directed to FIG. 2A which illustrates an example container API 200 according to some embodiments. The container API 200 allows programmers to create gadgets that can be stored in email messages and executed by an email application that includes a container application. The container API (Application programming interface) 200 defines various functions that allows a gadget to interface with the container application (e.g., FIG. 1, 129 and 131). The container application includes the functions defined in the container API. A gadget uses functions defined in the container API to instruct the container to perform various tasks. The container API 200, in FIG. 2A, defines a read interface 201 and a write interface 205. Each interface includes and defines one or more function calls. The read interface 201 includes functions to read gadget data from one or more sources. For example, the read interface 201 may define a getNumMessages function 202 to have the container return the number of messages in a thread. In another example, the reader interface 201 may define a GetMessage function 203 to have the container retrieve a particular message containing gadget data. The read interface 201 also includes functions 204 to save and load gadget execution states. The write interface 205 provides functions to write gadget data to a new email and to send the new email to all of the participants of an email thread. The gadget data is inserted into an email message encoded as a gadget MIME type. It is noted that FIG. 2A provides a non-limiting example of a container API and that the container API is not limited to the functions described in FIG. 2A.

Attention is now directed to FIG. 2B, which illustrates a block diagram of an email message 210 containing content encoded as a plain text MIME type 212 and content encoded as a gadget MIME type 222. The email messages 210 can be stored on the client device 102 or the email database 120 of the email server system 108. The portion of the email message 210 encoded as a plain text MIME type 212 includes a header 213 and plain text 220. In some embodiments, the header 213 includes a message ID 214, a thread ID 216 and a MIME type 218. In some embodiments, the message ID 214 identifies the particular email message. In some embodiments, the thread ID 216 identifies the thread that the respective message 210 belongs to. In some embodiments, the message ID 214 and the thread ID 216 are assigned to the message 210 by the email module 116 located on the email server system 108. In some embodiments, the MIME type 218 defines the MIME type of the respective portion of the message 210. For example, the portion of the message could be encoded as a plain text MIME type. In some embodiments, the header includes additional information such as a timestamp of when the message was sent, the sender of the message and a list of recipients of the message. The plain text 220 is text such as "hello world." When email message 210 is opened by a client application capable of viewing plain text MIME type messages, the plain text message 220 is displayed. In some embodiments, the content encoded as a plain text MIME type 212 is generated and inserted into message 210 by an email application (124 or 150).

The portion of email message 210 that is encoded as a gadget MIME type 222 allows gadgets and gadget data to be transported within email message 210. In some embodiments, the portion of the email message 210 encoded as a gadget MIME type 222 includes a header 224, a link to gadget code or gadget code 228, a gadget ID 230, an initialize section 232 and gadget data 23. The gadget MIME type 222 portion of message 210 is generated and inserted into message 210 by a container application (129 or 131) or an email application (124 or 150).

The gadget header 224 includes a MIME type 226 that defines the MIME type of the portion of the email message 210. In this example, MIME type 226 is a gadget MIME type. A gadget MIME type is a custom protocol for the transmission of gadgets and gadget data via e-mail.

In some embodiments, the link to gadget code 228 is a URI or URL to a gadget located on a remote server (e.g., Gadget Server System 106). In some embodiments, the actual gadget code corresponding to a gadget is included in the gadget MIME type portion of the email message 210. In some embodiments, the link to gadget code or gadget code 228 is obtained from the gadget module 114 on the gadget server system 106.

In some embodiments, the gadget ID 230 identifies the instance of the gadget 228. For example, this may be necessary when email message 210 or the thread that email message 210 belongs to includes multiple gadgets. In some embodiments, the gadget ID 230 is used to determine the identity of a gadget when there are multiple instances of the same gadget in the thread. For example, a thread of messages may include two voting gadgets that cover different topics. In some embodiments, the gadget ID 230 is used to identify messages that include gadget data corresponding to a gadget. In some embodiments, the instance ID 230 is used to identify a gadget on the gadget server system 106. In some embodiments, the gadget ID 230 is used to identify when the gadget was first executed. In some embodiments, the gadget ID 230 is generated when the gadget is inserted into an email or when the gadget is first executed. In some embodiments, the gadget ID 230 is obtained from the gadget module 114.

In some embodiments, the initialize section 232 includes initial values that are used by gadget 228 to initialize certain values and render the user interface. For example, the initial values could be a message or title of the gadget or the initial values of some count. In some embodiments, the initialize section 232 is executed first each time the gadget 228 is executed. In some embodiments, the initialize section 232 is present in each email message of a thread of messages. In some embodiments, the initialize section 232 is present in a single message of the a thread of messages.

In some embodiments, the gadget data 234 includes data used by the gadget 228. For example, the gadget data could include a vote count or a state of a game. For example, gadget data for a voting gadget might include instructions for incrementing or decrementing a vote. In another example, gadget data for a shipping tracking gadget includes a package tracking number. In yet another example, the gadget data for a weather gadget might include zip codes and a link to a weather website that can retrieve weather conditions for the zip codes. In some embodiments, the gadget data 234 is written in response to a user interaction with respect to the gadget (e.g., a user selecting a voting button or a user entering a chess move).

It is noted that only client applications that are capable of handling gadget MIME types can recognize and execute gadgets that are included in an email messages encoded as a gadget MIME type. When email message 210 is opened by a client application that is capable of executing gadgets, the plain text 220 is displayed and the output of the gadget 228 is displayed. It is noted that information such as the header 224, MIME type 226, link to gadget code or gadget code 228, gadget id 230, initialize section 232 and gadget data 234 is preferably not displayed. When email message 210 is opened by a client application that is not capable of executing gadgets, only the plain text 220 is displayed. As discussed herein there are many advantages to including gadgets and gadget data in email messages.

Attention is now directed to FIG. 2C which illustrates an example of an email message 240 containing a section encoded as a plain text MIME type 242 and a section encoded as a gadget MIME type 246. The section encoded as a plain text MIME type 242 includes a plain text output 244 (">Beer at TGIF!+1").

The section of email message 240 encoded as a gadget MIME type 246 includes a gadget instance ID 248, a link to a gadget 250 and gadget data 252.

As previously discussed, the gadget instance ID 248 is used to uniquely identify an instance of a gadget and used to determine when a gadget was first executed. The gadget instance ID 248 can be represented by any combination of letters and numbers.

The link to gadget 250 is a reference to gadget code on the gadget server system 106. In this example, the gadget referenced by the gadget link 250 is a voting gadget. When email message 240 is opened by an email client capable of handling gadget MIME type messages, the gadget code referenced by the gadget link 250 is retrieved and executed. In some embodiments, the gadget instance ID 248 is used in conjunction with the gadget link 250 to determine which gadget to access or retrieve.

Gadget data 252 includes data used by the gadget referenced by the link 250. In this example, gadget data 252 includes data "<increment value='1'>" to increment a vote count for "Beer at TGIF!" The initialize values 253 includes text ("Beer at TGIF!") for the output of the gadget.

When email message 240 is opened by a client application that is capable of executing gadgets, the plain text 244, the initial values 253 and the output of the gadget 250 are displayed. It is noted that information such as the plain text MIME type 242, gadget MIME type 246, gadget instance id 248, gadget data 252 is normally not displayed depending on the client application settings. It is also noted that not all instructions in the initialize section are displayed, only output instructions are displayed. When email message 210 is opened by a client application that is not capable of executing gadgets, only the plain text 244 is displayed. As discussed herein there are many advantages to including gadgets and gadget data in email messages.

Attention is now directed to FIG. 2D which is a block diagram illustrating the data flow of gadget data between a container 266 and a message thread 255 according to some embodiments. It is noted that in this example, the message thread 255 and the container 266 may both be located on the same system or remotely located from each other. The message thread 255 may be on a client device 102 or stored in the email database 120 on the email server system 108. The container 266 may be on the client device 102 or on the email server system 108. The container 266 is included in an email application or invoked by the email application.

As shown in FIG. 2D, message thread 265 includes message 257 and message 262. Each message includes content encoded as a plain text MIME type (Plain Text MIME type 258 and Plain Text MIME type 263) and content encoded as a gadget MIME type (gadget MIME type 259 and gadget MIME type 264). The portion of the messages containing content encoded as a gadget MIME type includes gadget code (Gadget Code 260 and Gadget Code 264), gadget data (Gadget Data 261 and Gadget Data 265) and a gadget ID 281. In some embodiments, one or more messages of the message thread 255 that include a portion encoded as a gadget MIME type also includes an initialize section 280 within the gadget MIME type portion.

When the container 266 detects that an email message 262 in a thread 255 contains an gadget MIME type 264 and an initialize section 280, the container 266 determines the gadget ID 281 corresponding to the gadget code 264 of the message 262 and aggregates gadget data (Gadget Data 261 and Gadget Data 265) from messages in the thread 255 that include gadget data corresponding to gadget ID 281. Stated in another way, the container 266 aggregates gadget data in a message thread 255 corresponding to a respective gadget ID 281 and then executes the gadget code 264 corresponding to the gadget ID 281. The executing gadget 264 accesses the aggregated data 284 and performs various operations with the aggregated data 284.

The container stores the gadget data gathered from the messages in the thread 255 as aggregated gadget data 284. In some embodiments, the aggregated gadget is a collection of XML documents (e.g., XML 290-1 and XML 290-2) with each document 290 containing gadget data from a respective message in the message thread 255. In some embodiments, the aggregated gadget data is stored as a single XML document that contains the gadget data from one or more messages in the thread 255. It is noted that the gadget data in thread 255 is not necessary in the form of a XML document. In some embodiments, the aggregated gadget data 284 is ordered by respective message arrival times. For example, the gadget data corresponding to the most recent message in the thread 255 could be first.

In some embodiments, the container 256 detects the gadget MIME type 264 and the initialize section 280 in a message 262 in response to user selection of any message of the message 255 that includes the message 262.

The container 266 includes a write interface 282 and a read interface 267 that allows a gadget to interface with the container 266. The write interface 282 and the read interface 267 each include functions that the executing gadget code 264 may call to instruct the container 266 to perform various functions. The functions corresponding to the write interface 266 and the read interface 267 are defined in the container API.

The container performs tasks in response to the executing gadget's 264 function calls. For example, in response to a read interface command issued by the executing gadget 264, the container may determine the number of message in message thread 255 and return that number to the executing gadget 264. In another example, the container may return apportion or all of the aggregated gadget data 284 to the executing gadget 264. For example, the container 266 may gather votes contained in the gadget data of multiple email messages in the thread 255, save the votes as aggregated gadget data 284 and return the vote count to the executing gadget 264 in response to one or more functions calls by the executing gadget 264. In some embodiments, the container 266 gathers data not located in the thread of email messages and returns the data to the executing gadget 264. For example, the container may obtain weather information from a weather site or package tracking information from a shipping website and return that information to the executing gadget. In some embodiments, the container 266 access email messages that are remotely located from the client. For example, the email messages may reside on the email server 108.

In some embodiments, executing gadget 264 issues one or more commands to the write interface 282 of the container 266 to generate a new message 268 with content encoded as a plaint text MIME type 272 and content encoded as a gadget MIME type 270. The container 266 inserts the gadget data 269 into the portion of new message 268 encoded as a gadget MIME type 270. In some embodiments, the content encoded as a plain text MIME type 272 includes a plain text message corresponding to the output of the executing gadget 264 or the new gadget data 269. The new message 268 is sent to one or more participants in the thread. In some embodiments, the container 266 sends the new message 268 to each recipient in the thread or issues commands to an email application to send the new message 268 to each recipient in the thread. The new message 268 provides updated gadget data to the one or more participants in the thread. As discussed herein there are many advantages to executing gadgets from email messages.

FIGS. 3A-1, 3A-2, 3A-3, 3A-4, 3B-1 and 3B-2 are flow diagrams illustrating a method 300 of executing gadgets from within email messages in accordance with some embodiments. The method 300 is performed at client system (e.g., client 102, FIG. 1, or user client device 500, FIG. 5) with one or more processors and memory. The client system is connected to a server system through a network and manages a client application.

As described below, the method 300 provides a way to execute gadgets located in email messages. Such method allows a user to access applications from their email application instead of having to visit and login to websites hosting standalone applications. Such methods also allow users who do not have email applications capable of executing gadgets to receive useful information from the gadgets. Such methods further provide users with a complete record of the collaboration. Such methods further facilitate user collaboration. It is noted that the examples given with respect to FIGS. 3A-1, 3A-2, 3A-3, 3A-4, 3B-1 and 3B-2 are nonlimiting.

FIGS. 3A-1, 3A-2, 3A-3 and 3A-4 illustrate a process 300 for executing a gadget from a message thread according to some embodiments of the invention. The method is executed on a client system having one or more processors and memory storing programs executed by the one or more processors (301). The client system is connected to a server system through a network and manages a client application. In some embodiments, method 300 is executed by an email application (FIG. 1, 124). In some embodiments, the email application includes a container module (FIG. 1, 129 and 131) that manages the execution of gadgets. In some embodiments, method 300 is executed by a container application module (FIG. 1, 129 and 131).

An email message that is a part of an email thread is received (302). The received email includes gadget instructions and associated gadget data (302). In some embodiments, the email thread includes a plurality of messages and at least two of the email messages include gadget instructions and associated gadget data. In some embodiments, received email includes a first section containing content encoded as a plain text MIME type and a second section containing content encoded as a gadget MIME type (304). In some embodiments, the gadget instructions and the gadget data are contained in the second section (306). In some embodiments, at least one message in the thread of the message includes gadget instructions and gadget data corresponding to two or more gadgets. In some embodiments, the instructions corresponding to the gadget includes a gadget instance ID that is obtained from a server system (310). In some embodiments, the gadget instance ID is obtained from the Gadget Server System 106. In some embodiments, the instructions corresponding to the gadget comprises a link to gadget code on a server system. In some embodiments, the gadget instructions include gadget code corresponding to the gadget. In some embodiments, the gadget instructions correspond to a gadget that is collaborative (312). In some embodiments, the gadget instructions correspond to a gadget that is selected from a group consisting of voting gadgets, gaming gadgets, calendar gadgets, shipment tracking gadgets and todo list gadgets (314).

In some embodiments, in response to user selection of the received message (320), updated gadget is obtained (322). In some embodiments, the updated gadget data is gadget data that is aggregated from one or more messages in the email thread. In some embodiments, the container detects that the received message includes a portion containing a gadget MIME type. In some embodiments, the container detects that the received message or another message in the corresponding message thread includes both a portion containing a gadget MIME type and an initialize section in the gadget MIME TYPE portion. As discussed above, the container may be located on the server or the client system. In some embodiments, the updated gadget data is aggregated from one or more messages in the thread of messages (324). To "aggregate", as used herein, means to collect or gather information from one or more sources into a single collection. In some embodiments, the container identifies one or more gadget identifiers corresponding to one or more gadgets in the received message (326). In some embodiments, the container identifies the gadget identifier from a message other than the received message in the email thread. In some embodiments, the container aggregates and stores gadget data from one or more messages in the email thread corresponding to the one or more identifiers (327). In some embodiments, the container stores aggregated gadget in one or more XML documents, each document containing gadget data from a respective message in the email thread. In some embodiments, the container stores aggregated gadget data in a single XML document. In some embodiments, the one or more XML documents are stored on the client device or on a server remotely located from the client device. In some embodiments, the gadget data is ordered by the corresponding timestamp of the messages in the email thread.

In some embodiments, the updated gadget data is aggregated from the gadget MIME type section of one or more messages in the email thread (328). In some embodiments, the updated gadget data is aggregated from plain text contained in one or more messages in the email thread (330). In some embodiments, the updated gadget data is a combination of data aggregated from messages with content encoded as the plain text MIME type and content encoded as the gadget MIME type and messages that only contain content encoded as the plain text MIME type. In some embodiments, the updated gadget data is a combination of plain text extracted from one or more messages in the email thread, gadget data extracted from one or more messages in the thread of messages and information obtained from one or more servers remotely located from the client device. The plain text is extracted from the portion of the one or more messages encoded as a plain text MIME type. The gadget data is extracted from the portion of the one or more messages encoded as a gadget MIME type. The executing gadget can aggregate information from any combination of sources.

In some embodiments, the updated gadget data is obtained from a server remotely located from the client system (332). For example, the gadget may track the shipment of a package and may obtain shipping information from a shipping site. In another example, a weather gadget may obtain weather data from a weather tracking site. In this example, the gadget data includes the location of the remote server (i.e., a URL) and information (i.e., the zip code) to obtain the updated gadget data (i.e., the current weather at the zip code). In some embodiments, the gadget data includes requests used to obtain data from servers remotely located from the client device. For example, the gadget data may include a HTTP request string that the container submits to a server remotely located from the client device. In some embodiments, the container aggregates information of email messages in the thread and one or more servers remotely located from the client.

In some embodiments, in response to user selection of the received email message (320) the gadget instructions are executed (322). In some embodiments, the gadget is executed automatically when a user selects a message. In other words, a user selects a message and without any further user action, the message is displayed and the gadget is executed. Each gadget is executed only once even though the gadget code for the respective gadget may be in each message of the message thread. In some embodiments, all of the gadgets in the most recently received message are executed. For example, the most recently received message may include three different gadgets. In some embodiments, only the gadgets from the user selected message are executed.

In some embodiments, the gadget is executed by a container application (FIG. 1, 129 and 131). The container application includes functions to execute gadgets, to read gadget data from one or more email messages, gather updated gadget data from servers remotely located from the client, gather gadget data from one or more messages in a message thread, to create a new email message, to encode gadget data as a gadget MIME type, to insert gadget data to email messages as a gadget MIME type and to send email messages. In some embodiments, the container application is located on the client system. In some embodiments, the container is a stand alone application, a web browser plug-in or is embedded in the client application (FIG. 1, 124). In some embodiments, the container application is located on a server remotely located from the client system. In some embodiments, the container is retrieved and executed in response to user selection of the received email message. In some embodiments, the container identifies gadget instructions from the portion of the selected email encoded as a gadget MIME type. In some embodiments, the instructions corresponding to the gadget comprise a link to gadget code on a server system and executing the gadget instructions includes retrieving gadget code referenced by the gadget instructions from the server system (342).

By executing a gadget from within an email application, a user does not have to visit other websites to access similar applications. E-mail is a widely used form of communication and users often want to collaborate with people they e-mail with. By executing gadgets from within an email application, a user has access to a large number of users to collaborate with. A user can also, based on e-mail communications, verify who they are collaborating with.

In some embodiments, the gadgets are executed based on one or more security policies. The security policies protect a user from the execution of malicious gadgets and ensures a user's privacy. In some embodiments, the gadget instructions are executed in accordance with a determination that the gadget is from a trusted domain (336). For example, only links to gadgets located to servers on the Google domain can be executed. In another example, when the gadget code is included in the received email, only gadget code including some identifying piece of information corresponding to an approved source can be executed. In some embodiments, the user can specify the source (e.g., domains) that gadgets can never be executed from. For example, gadgets from a spam domain can never be executed. In some embodiments, the gadget instructions are executed in accordance with a determination that the domain of the sender address of the sender of the received email address is trusted. For example, only gadgets included in emails from a sender with an address in the Google domain can be executed.

In some embodiments, the gadget is executed in accordance with a determination that the gadget is received from a sender in an address book associated with a user of the client system (338). This security measure helps protect users against spammers. In addition, a user may customize who they collaborate with by creating lists of contacts to collaborate with. For example, a user may only want to collaborate with co-workers and thus only gadgets from senders on a co-worker contact list are allowed to execute.

Users who have email applications that do not support widgets can still collaborate with users with email applications that support gadgets by sending and receiving plain text messages that follow a certain convention. The convention will largely depend on the gadget implementation. A gadget developer may define a set of text phrases or a special annotation a user can use and that a gadget will understand. For example, for a voting application a user could send a plain text message, "#bubble tea+1" to mean that the user is voting for bubble tea. The container would aggregate count the user's vote for bubble tea and send the use a voting result in the form of plain text.

Storing gadget data in email threads enables users to easily collaborate with other users. A user can simply forward a message thread to another user to include the user in the coloration. Saving gadget data in email messages also provides a convenient place for storage since users can easily organize and search for message threads.

In some embodiments, the gadget is executed in accordance with a determination that the gadget has been approved for execution by a user of the client system (340). For example, a user may want to individually approve each gadget instance. In some embodiments, the gadget is executed in accordance with a determination that the thread in which the gadget is included has been approved for gadget execution by the user. For example, a user may only want gadget execution from certain message threads such as a thread about fantasy football. In some embodiments, a user can specify write permissions for each gadget. For example, a user may specify that a gadget is not allowed to construct and send new email messages containing gadget data. Such feature gives a user control of the execution of gadgets thereby encouraging users to make use of gadgets.

In some embodiments, a combination of one or more security policies is used. In some embodiments, a security module (e.g., FIG. 1, 128) stores the one or more security policies and determines whether the gadget is allowed to execute in view of the security policies. In some embodiments, the security module is embedded in the email application (FIG. 1, 124), or is a stand alone application or is embedded in the container (FIG. 1, 129). In some embodiments, the container (FIG. 1, 129 and 131) determines whether the gadget is allowed to execute in view of the one or more security policies. The one or more security policies ensures that annoying or malicious gadgets are not executed on the client device.

In some embodiments, the executing gadget executes the initialize section (e.g., FIG. 2B, 232) of the portion of the received email encoded as a gadget MIME type. In some embodiments, the initialize section initializes one or more variables used by the gadget. In some embodiments, the initialize section instructs the gadget to display one or more messages or graphical user elements. In some embodiments, the initialize section instructs the gadget to obtain aggregated gadget data from the container. For example, the gadget may retrieve a state of the gadget application from the container. In some embodiments, the state of the gadget application could be the state of a game or the current vote count for a vote. In some embodiments, the initialize instructions include one or more commands instructing the container to perform various tasks. For example, the initialize section includes one or more commands to obtain the aggregated gadget data from the container.

In some embodiments, after the gadget executes the initialize section, the gadget access the aggregated gadget data from the container and performs one or more operations with the aggregated gadget data. For example, the aggregated gadget data may include votes and the executing gadget may count the votes and prepare a display of the updated vote counts. In another example, the aggregated gadget data may include weather information and the executing gadget my prepare and format the weather information for display. In another example, the aggregated gadget may include information for a game and the executing gadget may prepare to display the game with the information. For example, the game may be a chess game and the gadget data may include the position of the pieces on the chess board.

Figures 1, 3A:
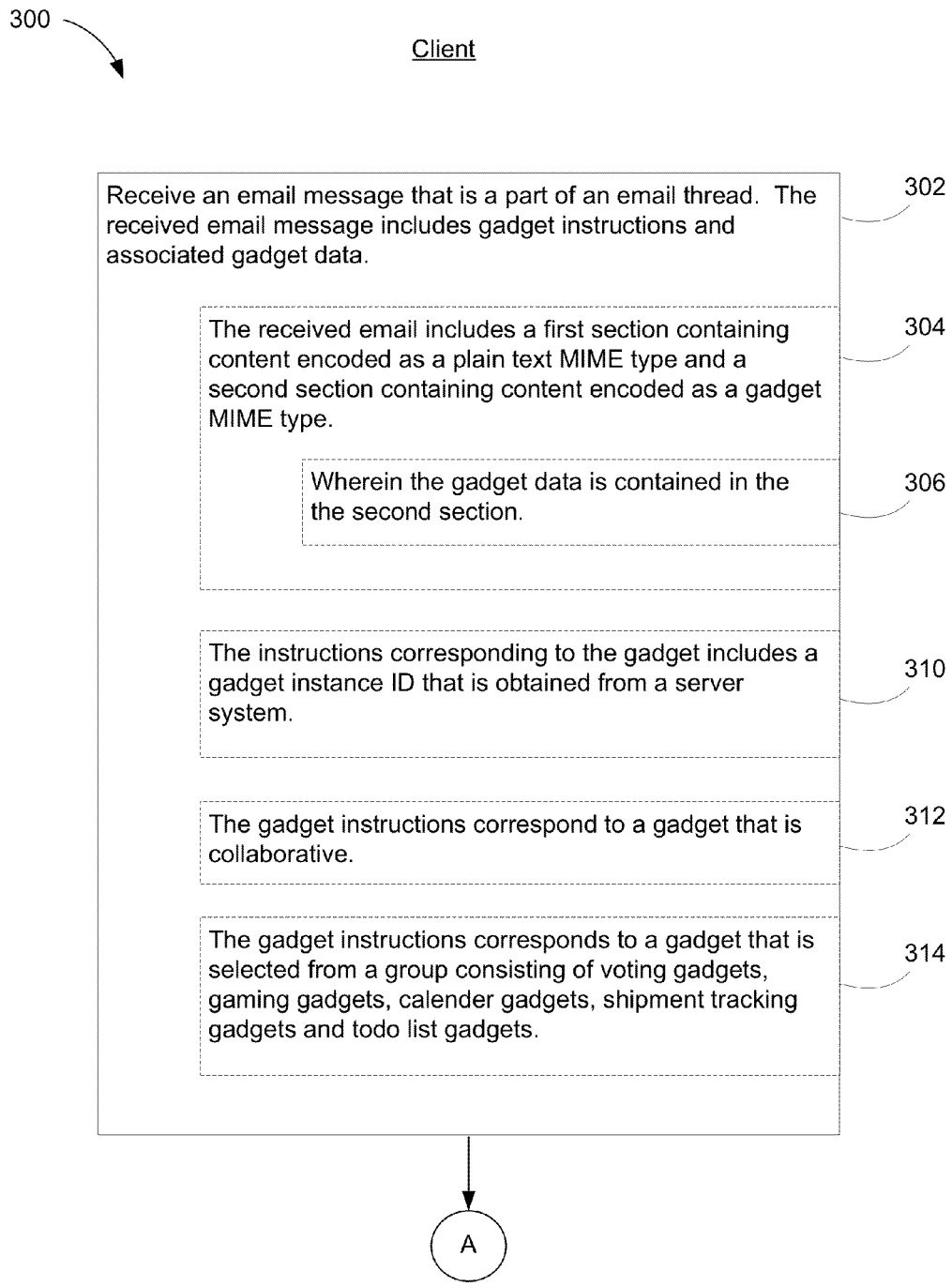
Figures 2, 3A:
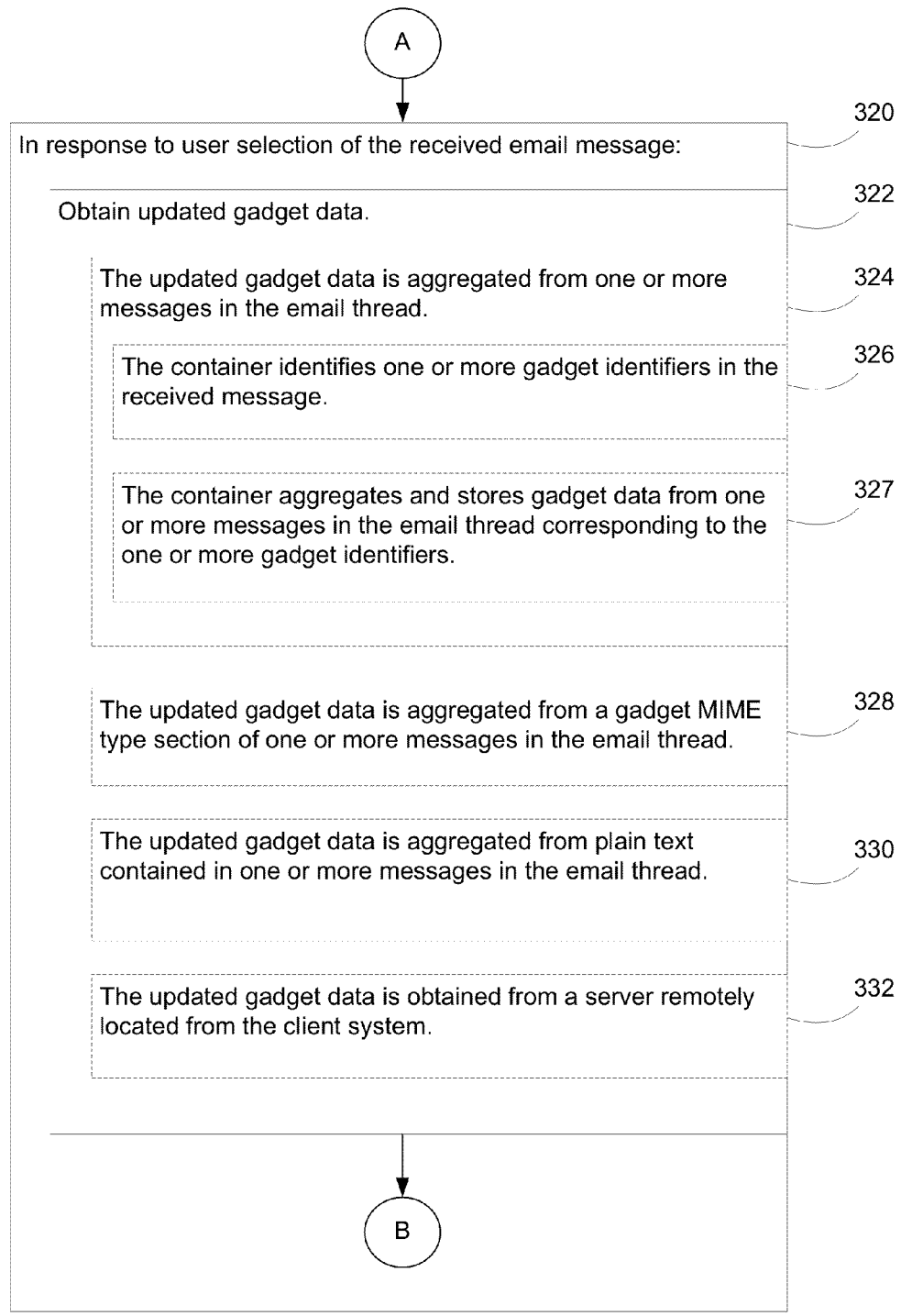
Figures 3, 3A:
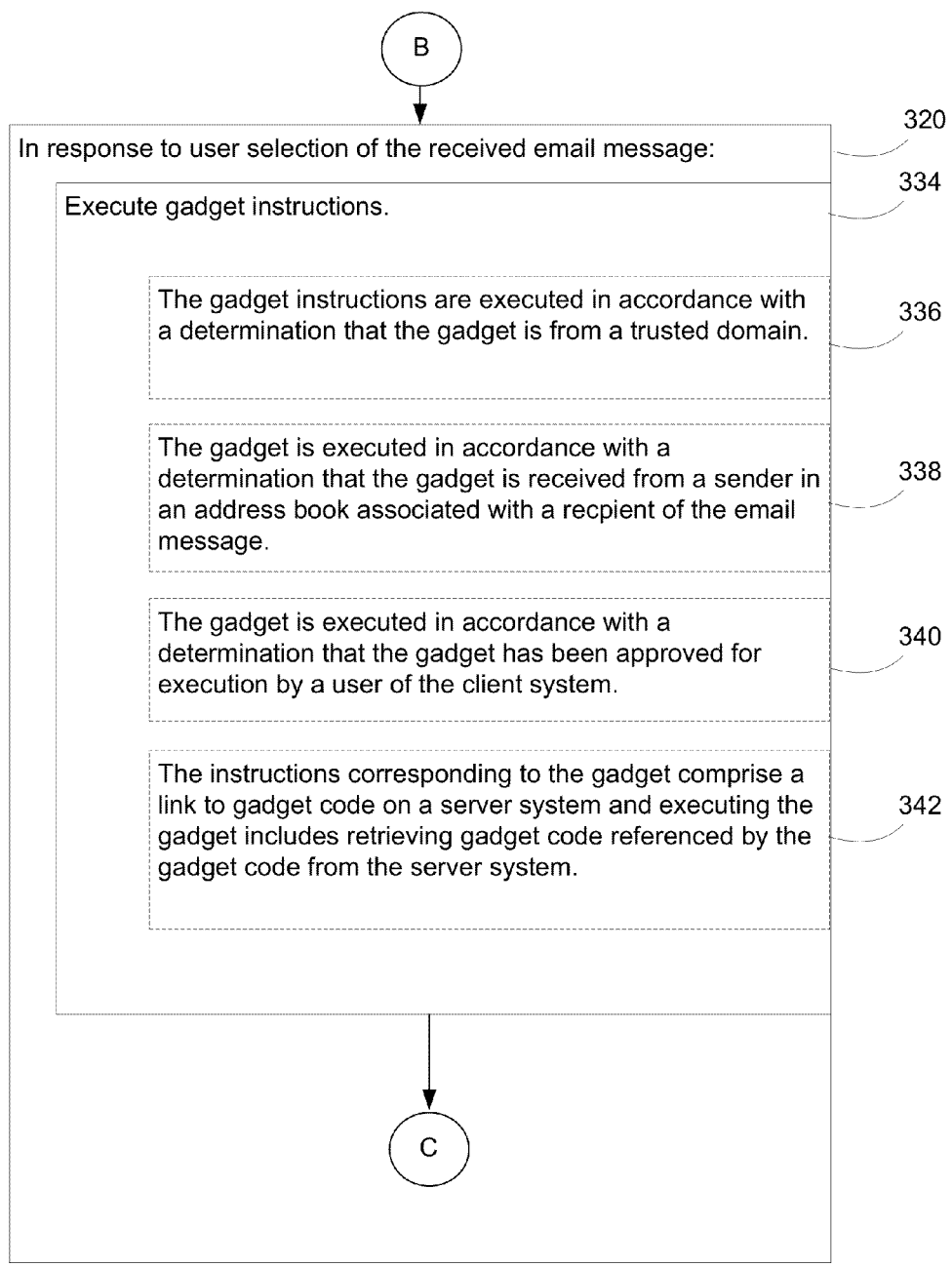
Figures 3, 3A, 4:
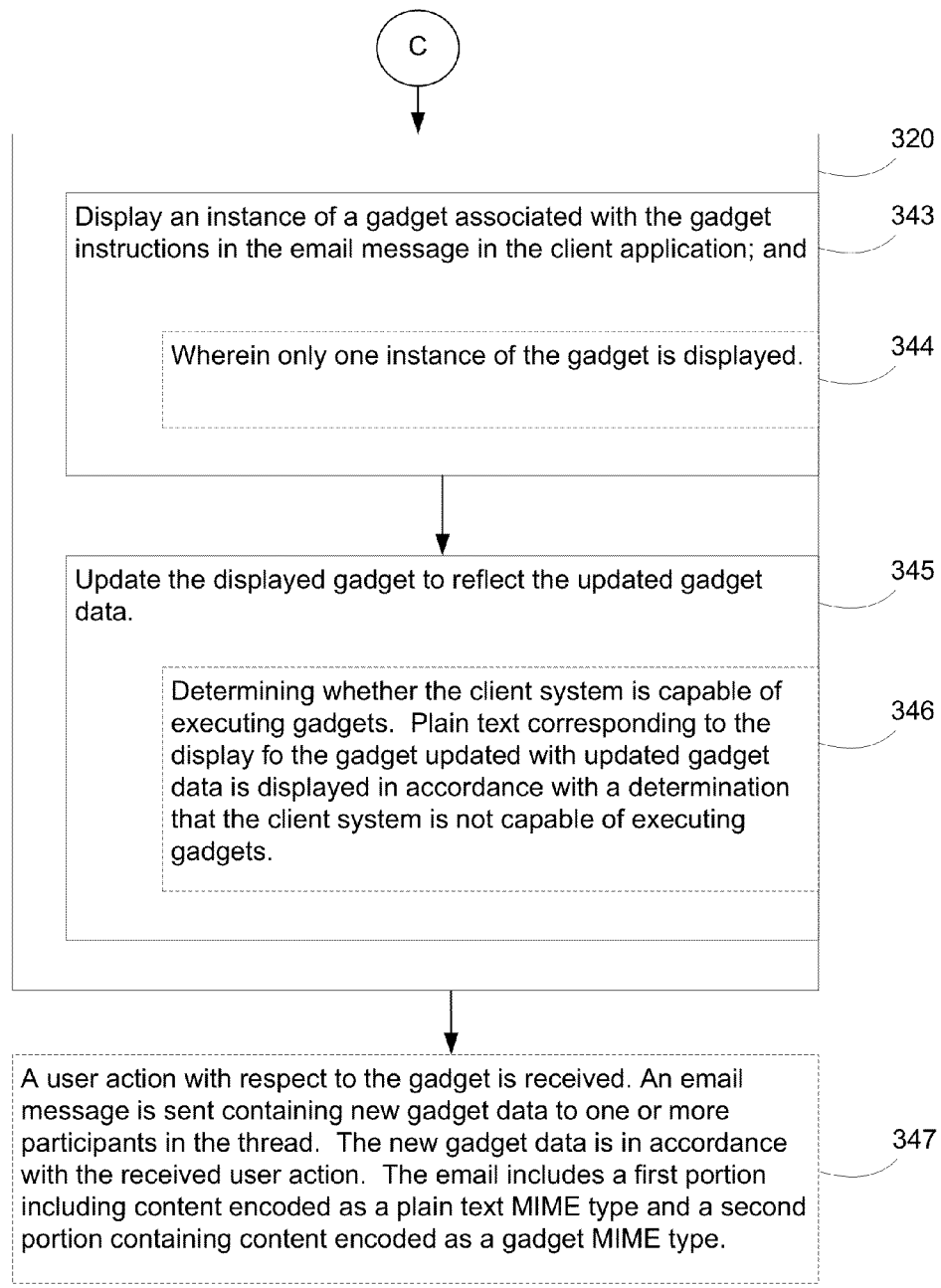

Attention is now direct to FIG. 3A-4, an instance of the gadget associated with the gadget instructions in the email message is displayed in the client application according to some embodiments (343). In some embodiments, only one instance of the gadget is displayed (344). For example, a user may concurrently display multiple messages in a thread of messages. Each of the displayed messages may include the gadget however, only one instance of the gadget is displayed. In some embodiments, the gadget corresponding to the most recent message in the thread is executed and displayed. In some embodiments, when there are multiple distinct gadgets in the received message, each gadget is displayed resulting in the concurrent display of multiple gadgets.

In some embodiments, the displayed gadget is updated to reflect the updated gadget data (345). In some embodiments, the executing gadget uses aggregated gadget data from the container to prepare an updated display that reflects the updated gadget data/aggregated data. For example, for a shipping gadget, the displayed gadget displays the tracking history of a package. In another example, for a voting gadget, the displayed gadget displays the individual vote count for a vote. In yet another example, for a chess gadget, the displayed gadget displays the current state of a chess board that reflects moves made by players of the game.

In some embodiments, it is determined whether the client system is capable of displaying the gadget MIME type and in accordance with a determination that the client system is not capable of executing gadgets, plain text corresponding to the display of the gadget updated with updated gadget data is displayed (346). Displaying plain text corresponding to the updated gadget provides backwards compatibility for users who do not have email clients that are capable of executing gadgets. Therefore, users who have an email client that is not capable of executing gadgets can still view a plain text output corresponding to the gadget output. For example, a recipient may receive an email containing a weather gadget and instead of viewing the executing of the gadget, the recipient views a plain text output corresponding to the output of the executing gadget (e.g., the weather at the sender's location).

In some embodiments, the displayed gadget includes one or more interface elements. For example, a voting gadget includes one or more voting buttons. In another example, in a package tracking gadget, the gadget includes a text box to receive a package tracking number. In some embodiments, a user action with respect to the gadget is received (347). For example, the user action may include, but is not limited to, selecting a voting button in a voting gadget, entering a task into a task gadget, entering a tracking number into a shipment tracking gadget or entering a movement in a game gadget.

A new email message containing the new gadget data is sent to one or more participants in the thread (347). The new gadget data is in accordance with the received user action (347). The email includes a first portion including content encoded as a plain text MIME type and a second portion containing content encoded as a gadget MIME type (347). For example, for a voting gadget, the updated gadget data includes data to increment a vote for a candidate. For example, in a game gadget, the updated game data may include a user's move with respect to the game. In some embodiments, the updated gadget data is a state of the gadget. For example, in a voting application, the updated gadget is the current vote count. In some embodiments, the updated gadget data includes only data corresponding to the user action (e.g., an individual vote).

In some embodiments, the executing gadget issues one or more commands to the container to construct a reply email containing a portion encoded as a plain text MIME type and a portion encoded as a gadget MIME TYPE. The executing gadget also issues one or more commands to the container to write new gadget data to the reply email. In some embodiments, the executing gadget issues one or more commands to the container to construct a reply email in response to a user action to the displayed gadget. In some embodiments, the new email message is created and sent in response to receiving the user action. In other words, in response to user selection of a gadget button and without any further user action, an email containing updated gadget data corresponding to the user selection is sent to each user of the respective message thread. For example, after a user selects a voting button on a voting gadget, a new email containing the gadget data corresponding to the user's selection is sent to one or more participants in the thread. In some embodiments, the new email is created in response to the user action but it is not sent until the user selects a send option. In some embodiments, a user may only desire to send the updated gadget data to a subset of the users of a thread. For example, a user may want to remove a user from the collaboration. The new email message provides an update to other users in the thread and ensures that each user of the thread has a complete record of the collaboration.

Figures 1, 3B:
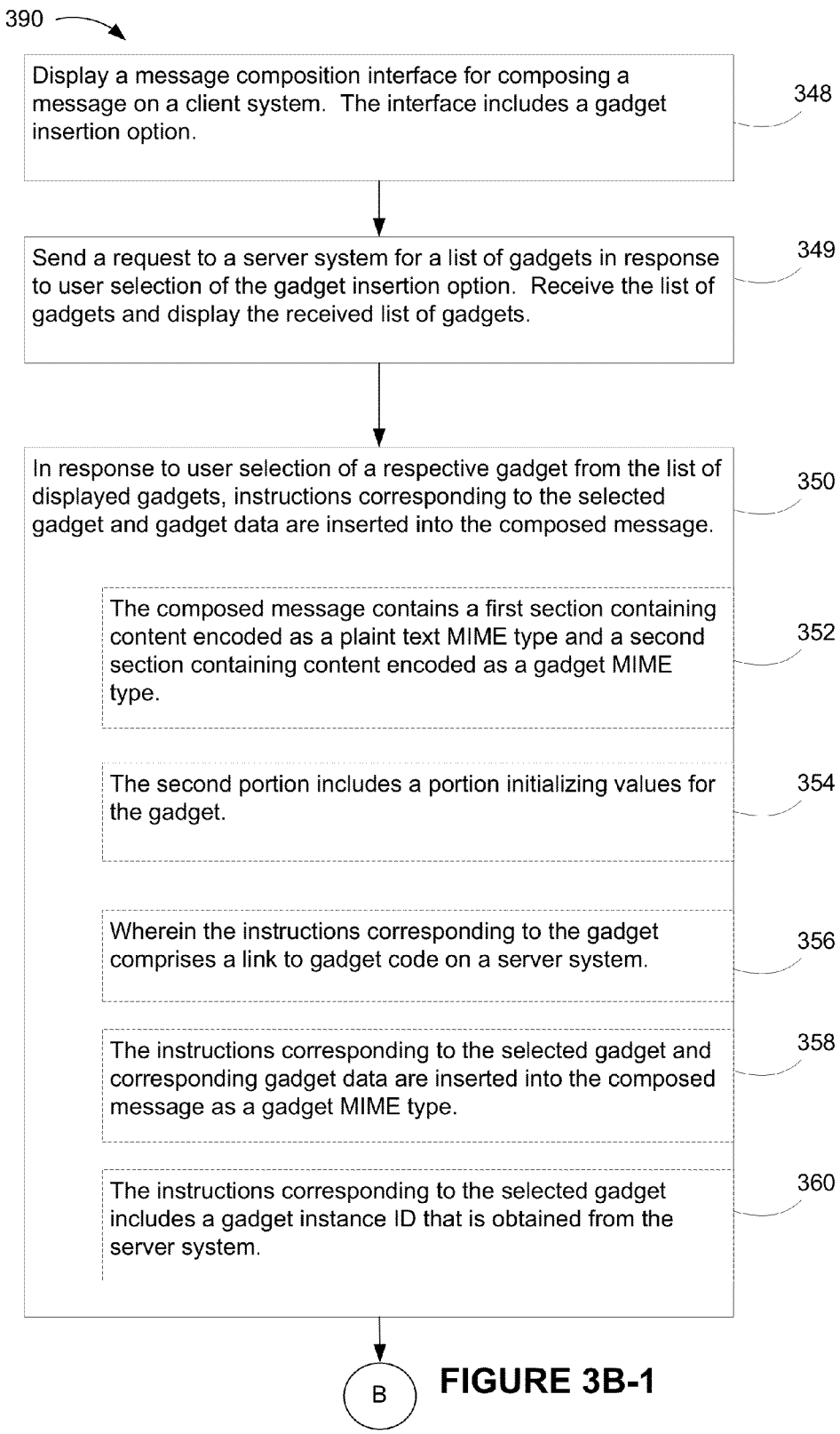
Figures 2, 3B:
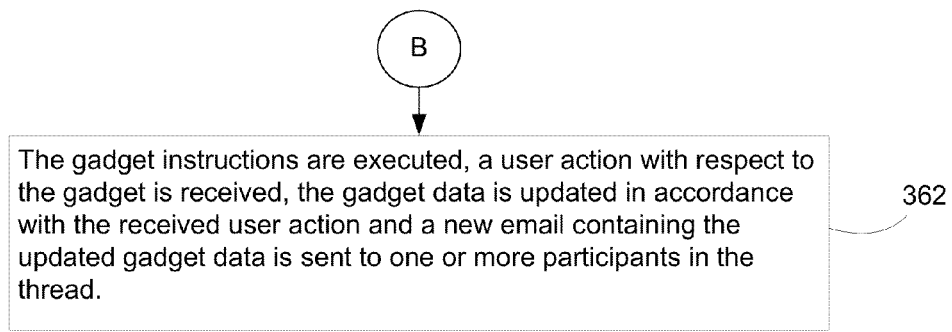
Figure 4:
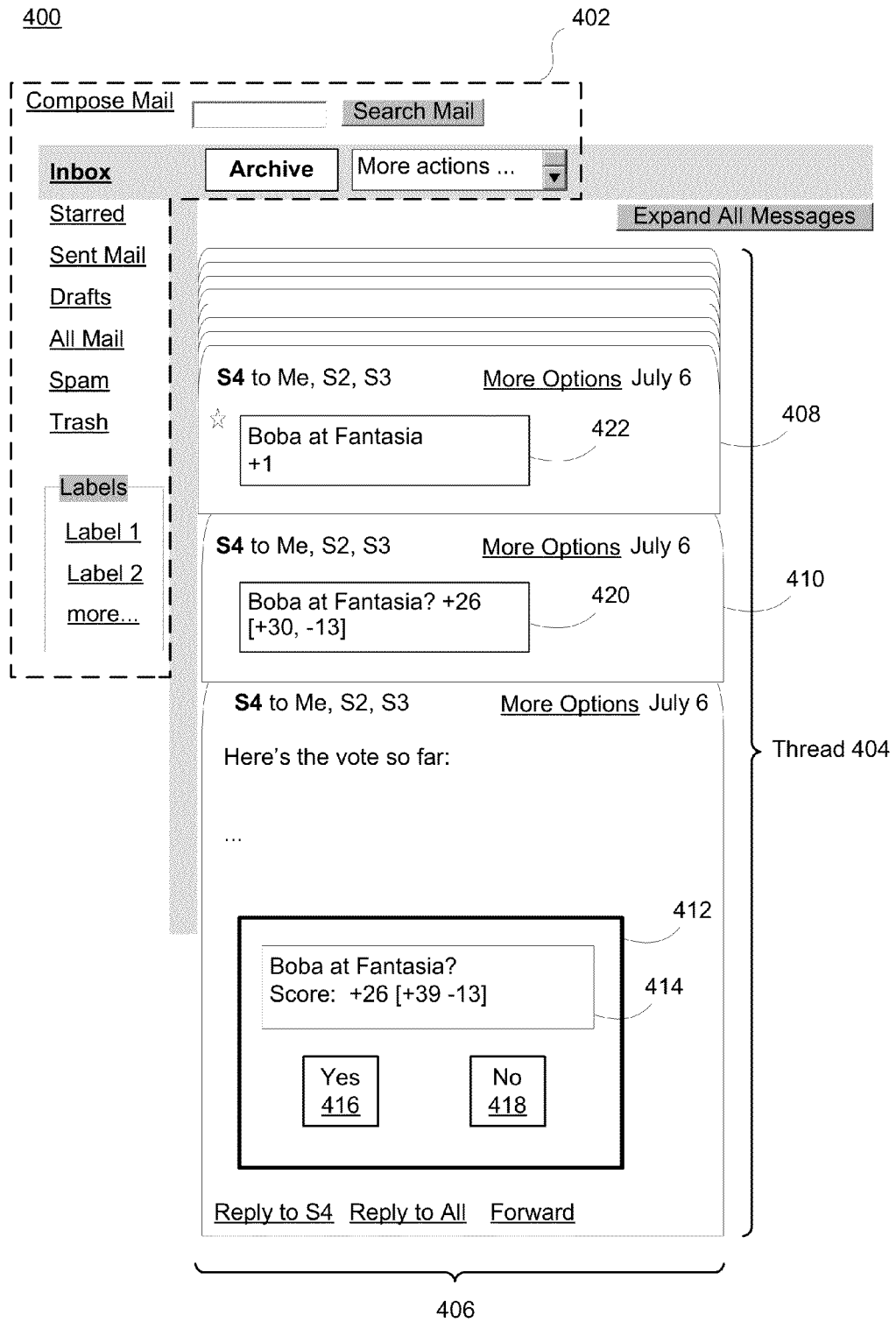

Attention is now directed towards FIGS. 3B-1 and 3B-2 which illustrate a method 390 for inserting a gadget into an email message. Method 390 is executed on a client system, having one or more processors and memory storing programs executed by the one or more processors. The client system is connected to a server system through a network and manages a client application.

In some embodiments, on a client system, a message composition interface for composing a message is displayed (348). The interface includes a gadget insertion option (348). In some embodiments, in response to user selection of the gadget insertion option, a request for a list of gadgets is sent to a server system, a list of gadgets is received and the received list of gadgets is displayed (349). In some embodiments, the request is sent by a container module. In some embodiments, the gadgets are received only from a user approved source. For example, the gadget may only be received from a certain server address or domain.

In some embodiments, in response to user selection of a respective gadget from the list of displayed gadgets, instructions corresponding to the selected gadget and gadget data are inserted into the composed message (350). In some embodiments, the instructions corresponding to the selected gadget and gadget data are inserted into the composed message by a container module. The composed message contains a first section containing content encoded as a plain text MIME type and a second section containing content encoded as a gadget MIME type (352). In some embodiments, the second section includes a portion initializing values for the gadget (354). The initial values are used to setup the gadget. For example, for a voting gadget, the initial values may include a title, the candidates for voting and the vote count for each candidate. In some embodiments, the values in the initial values are entered by a user when the gadget is first executed. In some embodiments, the instructions corresponding to the gadget comprises a link to gadget code on a server system (356). In some embodiments, the instructions corresponding to the selected gadget and gadget data are inserted into the composed message encoded as a gadget MIME type (358). In some embodiments, the instructions corresponding to the selected gadget includes a gadget instance ID that is obtained from the server system (360). In some embodiments, after the selected gadget and gadget data are inserted into the composed message, the gadget instructions are executed for the first time and a graphical user interface for the gadget is displayed. In some embodiments, the user enters initial values into the gadget using the gadget's graphical user interface. For example, a user may enter a short title for a voting application. In some embodiments, the user entered initial values are stored in gadget data of the composed message in an initialize section (e.g., FIG. 2C, 253). In some embodiments, the gadget instructions are executed, a user action with respect to the gadget is received, and a new email containing new gadget data is sent to one or more participants in the thread (362). In some embodiments, the new email message is created and sent in response to receiving the user action. For example, a user may make the initial vote in a voting gadget or the initial move in a game gadget. In some embodiments, the new email is created in response to the user action but it is not sent until the user selects a send option. For example, a user may interact with a gadget and include a plain text message in the new email message. The new message provides the start of a gadget collaboration.

Attention is now directed towards FIG. 4 which is a schematic screenshot 400 of a thread of messages 404 and the output of gadget 412 from message 406 displayed on a display (e.g., 513) of a client device. In some embodiments, only one displayed message displays the gadget 412. Thus, only one instance of the gadget 412 is displayed. For example, the output of gadget 412 is displayed in message 406 and not messages 408 and 410. In some embodiments, messages other than the message with the executing gadget display plain text messages. In some embodiments, as shown in message 408, the plain text message 422 corresponds to a user's action with respect to a gadget. For example, as shown in message 408, the sender of message 408 has voted yes in response to the survey question of "Boba at Fantasia." In some embodiments, as shown in message 410, the plain text message 420 corresponds to a summary of the aggregated gadget data. For example, plain text message 420 shows the current vote count. In some embodiments, the gadget 412 includes a summary 414 of the aggregated gadget data and interface elements 416 and 418. It is noted that different gadgets will have different interface elements. For example, a task list may contain a text field for entering a task. As shown in FIG. 4, the interface elements 416 and 418 corresponding to a voting gadget. When a user interacts with the interface elements 416 and 418 a reply email, containing gadget data corresponding to the user's action, is sent to one or more users of the thread 404. In some embodiments, the reply email is sent when the user selects an interface element 416 or interface element 418. In some embodiments, a reply email is not sent until the user selects a send option. It is noted that the thread 404 can include more than one gadget.

Figure 5:
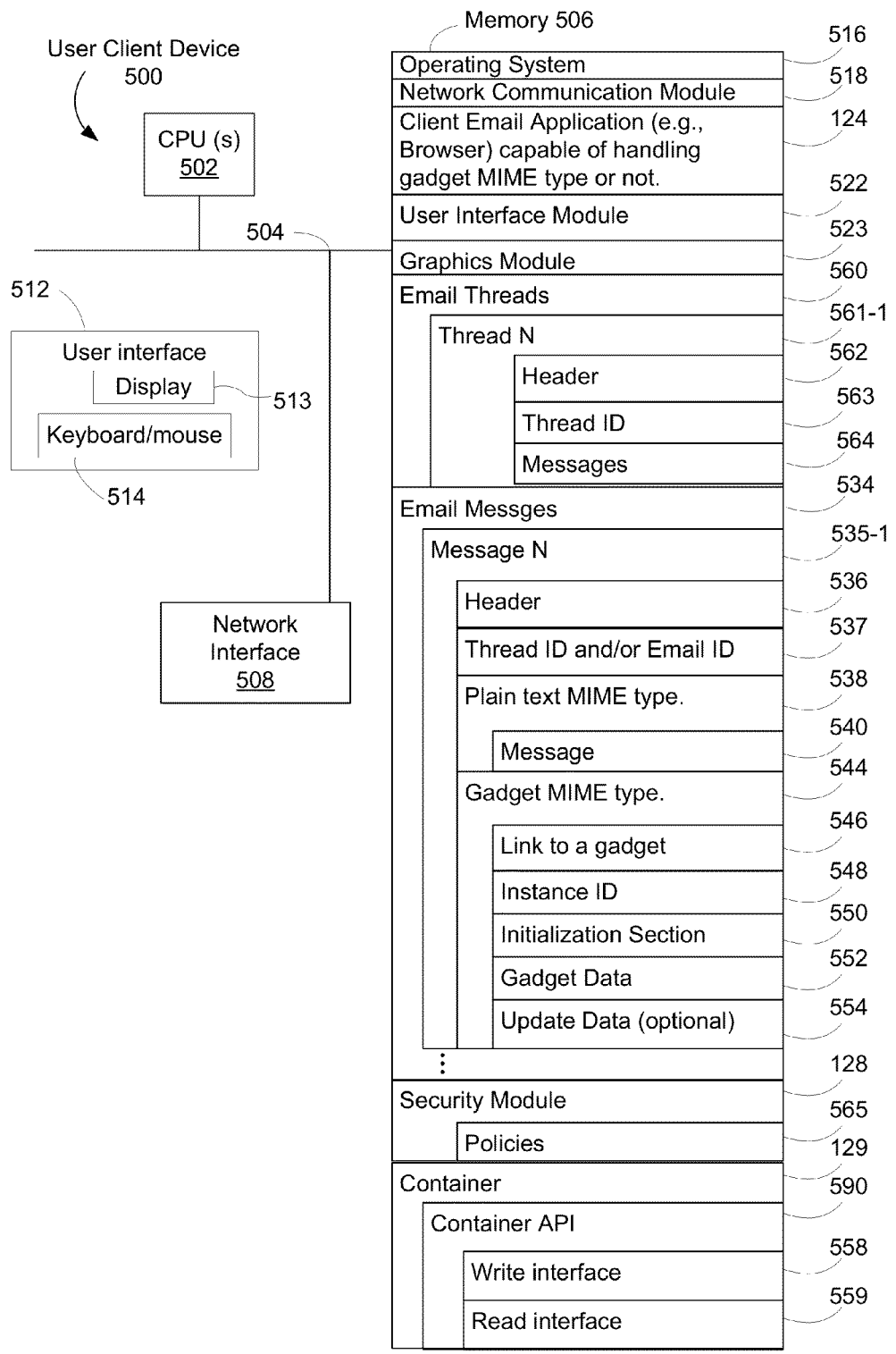
FIG. 5 is a block diagram illustrating the structure of exemplary user client device computers according to some embodiments of the invention.

FIG. 5 is a block diagram illustrating a client device 500, in accordance with one embodiment of the present invention. The client device 500 typically includes one or more processing units (CPU's) 502, one or more network or other communications interfaces 508, memory 506, and one or more communication buses 504 for interconnecting these components. The client device 500 may also include a user interface comprising a display device 513 and a keyboard and/or mouse (or other pointing device) 514. Memory 506 includes high-speed random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices. Memory 506 may optionally include one or more storage devices remotely located from the CPU(s) 502. Memory 506, or alternatively the non-volatile memory device(s) within memory 506, comprises a computer readable storage medium. In some embodiments, memory 506 or the computer readable storage medium of memory 506 store the following programs, modules and data structures, or a subset thereof including operation system 516, network communication module 518, a client email application 520, user interface module 522, graphics module 523, emails 534, security module 556 and container 557.

The operating system 516 includes procedures for handling various basic system services and for performing hardware dependent tasks.

The network communication module 518 facilitates communication with other devices via the one or more communication network interfaces 508 (wired or wireless) and one or more communication networks, such as the Internet, other wide area networks, local area networks, metropolitan area networks, and so on.

The client email application (or instructions) 124 is used for receiving, drafting and sending email messages. The client email application 124 may be a stand alone application or a web browser application that is capable of executing gadgets. In some embodiments the client email application is not capable of executing gadgets. The client email application is discussed in greater detail in the discussion of FIG. 1.

The user interface module 522 tracks user input and selections from a gadget or client email application.

The graphics module 523 displays the email application 520 and gadgets on the display 513 or other display.

Email threads 560 include one or more email threads 561. Each thread 561 includes a thread header 562 and a thread ID 563. The thread ID 563 identifies the thread. The thread header identifies a subject or topic of a thread. The thread 561 also includes email messages 564.

Email messages 534 include one or more email messages 535. Email messages are discussed in greater detail in the discussion of FIG. 1 (Email with plain text MIME type 125), FIG. 2B and FIG. 2C. Each email message 535 includes a header 536, thread ID and/or Email ID 537, and content encoded as a plain text MIME type 538. In some embodiments, email messages 525 include content encoded as a gadget MIME type 544. The Email ID 537 identifies the message. The thread ID identifies the thread that the message belongs to. The section of the email messages that is encoded as a plain text mime type 538 includes a plain text message 540. The portion encoded as a gadget MIME type includes a link to a gadget 546, instance ID 548, initialization section 550, gadget data 552 and update data 554. Emails message 534 and email threads 560 are described in greater detail in the discussion of FIG. 2B and FIG. 2C.

The security module 128 determines whether a gadget has permission to execute on the client device 500. The security module 128 includes one or more security policies 565 that determine whether a gadget should be executed. For example, the security module 128 could ensure that only user authorized gadgets, gadgets from certain domains or that only gadgets in emails received from users in the recipient's address book can be executed. In some embodiments, the security module 128 is embedded in the client application 124 or is a stand alone application or is embedded in the container module 129.

The container module 129 includes a container API 560. The container API 560 includes a write interface 558 and a read interface 559. The container module 129 and the container API 560 is described in greater detail in the discussion of FIG. 1, FIG. 2 and FIG. 2D.

Each of the above identified elements may be stored in one or more of the previously mentioned memory devices, and each of the modules or programs corresponds to a set of instructions for performing a function described above. The above identified modules or programs (i.e., sets of instructions) need not be implemented as separate software programs, procedures or modules, and thus various subsets of these modules may be combined or otherwise re-arranged in various embodiments. In some embodiments, memory 506 may store a subset of the modules and data structures identified above. Furthermore, memory 506 may store additional modules and data structures not described above.

Although FIG. 5 shows a client system, FIG. 5 is intended more as functional description of the various features which may be present in a set of clients than as a structural schematic of the embodiments described herein. In practice, and as recognized by those of ordinary skill in the art, items shown separately could be combined and some items could be separated. For example, some items (e.g., user interface module 522 and graphics module 523) shown separately in FIG. 5 could be implemented on a single client and single items could be implemented by one or more clients.

Figure 6:
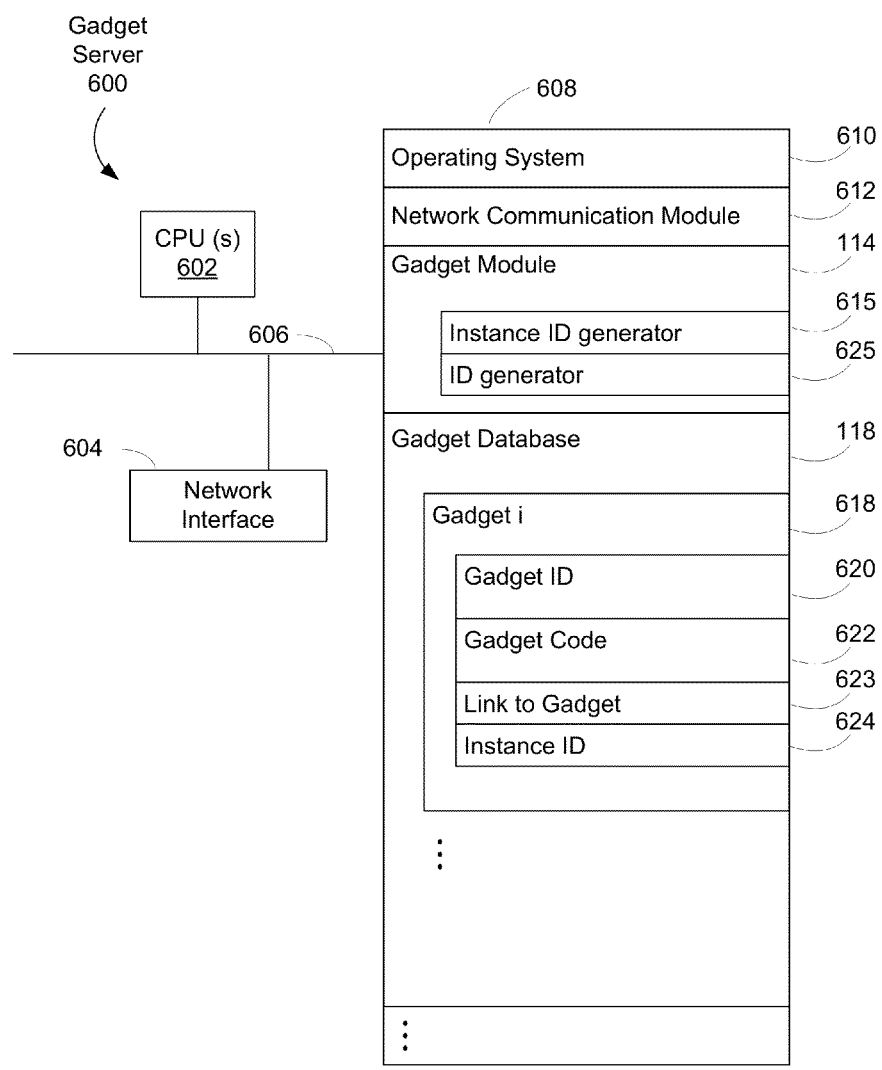
FIG. 6 is a block diagram illustrating the structure of an exemplary gadget server computer according to some embodiments of the invention.

FIG. 6 is a block diagram illustrating a gadget server system 600, in accordance with one embodiment of the present invention. The server 600 typically includes one or more processing units (CPU's) 602, one or more network or other communications interfaces 604, memory 608, and one or more communication buses 606 for interconnecting these components. Memory 608 includes high-speed random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices. Memory 608 may optionally include one or more storage devices remotely located from the CPU(s) 602. Memory 608, or alternatively the non-volatile memory device(s) within memory 608, comprises a computer readable storage medium. In some embodiments, memory 608 or the computer readable storage medium of memory 608 store the following programs, modules and data structures, or a subset thereof including an operation system 610, a network communication module 612, a gadget module 614 and a gadget database 616.

The operating system 610 includes procedures for handling various basic system services and for performing hardware dependent tasks.

The network communication module 612 facilitates communication with other devices via the one or more communication network interfaces 604 (wired or wireless) and one or more communication networks, such as the Internet, other wide area networks, local area networks, metropolitan area networks, and so on.

The gadget module 114 assigns instances IDs to gadgets and sends gadgets or a link to a gadget to other devices. The gadget module 114 includes an instance ID generator 615 that generates instance IDs. In some embodiments, the gadget module 114 includes a ID generator 625 for generating gadget IDs. The gadget module 114 is discussed in further detail in the discussion of FIG. 1.

The gadget database 118 stores gadgets 618. Each gadget includes a gadget ID 620 and gadget code 622. In some embodiments, each gadget also includes an instance ID 624 and a link to the gadget code 623. The gadget ID 620 identifies the gadget. The instance ID 624 identifies a particular instance of a gadget. The gadget database 118 is discussed in further detail in the discussion of FIG. 1.

Each of the above identified elements may be stored in one or more of the previously mentioned memory devices, and each of the modules or programs corresponds to a set of instructions for performing a function described above. The above identified modules or programs (i.e., sets of instructions) need not be implemented as separate software programs, procedures or modules, and thus various subsets of these modules may be combined or otherwise re-arranged in various embodiments. In some embodiments, memory 608 may store a subset of the modules and data structures identified above. Furthermore, memory 608 may store additional modules and data structures not described above.

Although FIG. 6 shows a server, FIG. 6 is intended more as functional description of the various features which may be present in a set of servers than as a structural schematic of the embodiments described herein. In practice, and as recognized by those of ordinary skill in the art, items shown separately could be combined and some items could be separated. For example, some items (e.g., gadget module 614 and gadget database 616) shown separately in FIG. 6 could be implemented on single servers and single items could be implemented by one or more servers. The actual number of servers used to implement the server system 600 and how features are allocated among them will vary from one implementation to another, and may depend in part on the amount of data traffic that the system must handle during peak usage periods as well as during average usage periods.

Figure 7:
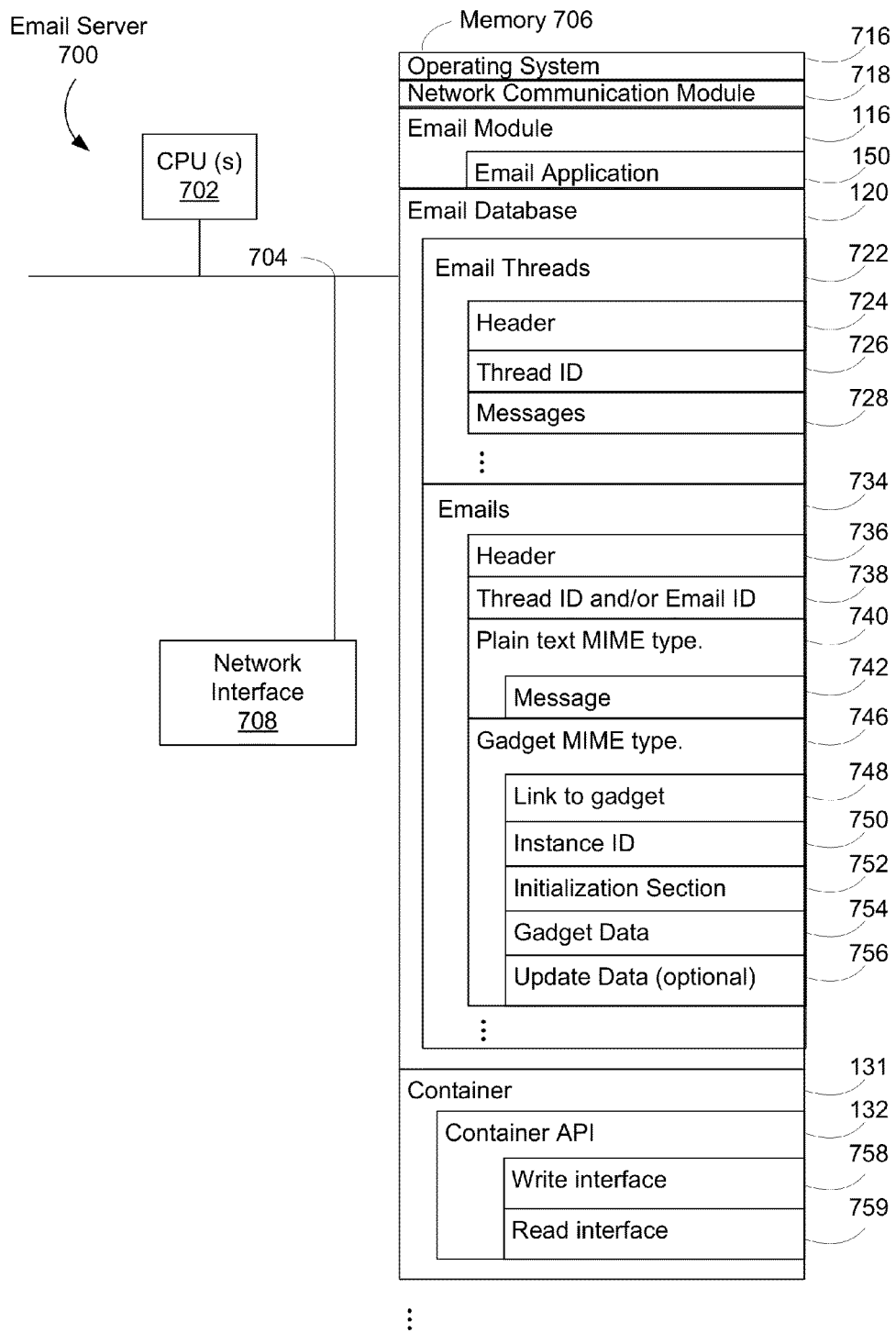
FIG. 7 is a block diagram illustrating the structure of an exemplary email server computer according to some embodiments of the invention.

FIG. 7 is a block diagram illustrating a email server system 700, in accordance with one embodiment of the present invention. The email server system 700 typically includes one or more processing units (CPU's) 702, one or more network or other communications interfaces 708, memory 706, and one or more communication buses 704 for interconnecting these components. Memory 706 includes high-speed random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices. Memory 706 may optionally include one or more storage devices remotely located from the CPU(s) 702. Memory 706, or alternatively the non-volatile memory device(s) within memory 706, comprises a computer readable storage medium. In some embodiments, memory 706 or the computer readable storage medium of memory 706 store the following programs, modules and data structures, or a subset thereof including a operating system 716, a network communication module 718, a email module 720, a email database 721 and a container 757.

The operating system 716 includes procedures for handling various basic system services and for performing hardware dependent tasks.

The network communication module 718 facilitates communication with other devices via the one or more communication network interfaces 708 (wired or wireless) and one or more communication networks, such as the Internet, other wide area networks, local area networks, metropolitan area networks, and so on.

The email module 116 manages emails in the email database 721 and assigns email IDS 726. In some embodiments, the email module 720 includes an email application 150. The and the email module 720 email application 150 are discussed in greater detail in the discussion of FIG. 1.

The email database 120 stores email messages 734 and threads of email messages 722. The email threads 722 include a header 724, a thread ID 726 and one or more messages 728. The email messages 734 include a header 736, thread ID and/or email ID 738 and content encoded as a plain text MIME type 740. The content encoded as a plain text MIME type 740 includes a plain text message 742. In some embodiments, the email messages 734 includes a portion containing content encoded as a gadget MIME type 746. The portion containing content encoded as a gadget MIME type includes a link to a gadget 748, an instance ID 750, an initialization section 752, a gadget data 754 and update data 756. The email database 120, email messages 734 and email threads 722 are discussed in greater detail in the discussion of FIG. 1, FIG. 2B (Message 210), FIG. 2C (Email Message 240) and FIG. 2D (Message Thread 255).

The container module 131 includes a container API 132. The container API 132 includes a write interface 758 and a read interface 759. The container module 131 and the container API 132 are described in greater detail in the discussion of FIG. 1, FIG. 2 and FIG. 2D.

Each of the above identified elements may be stored in one or more of the previously mentioned memory devices, and each of the modules or programs corresponds to a set of instructions for performing a function described above. The above identified modules or programs (i.e., sets of instructions) need not be implemented as separate software programs, procedures or modules, and thus various subsets of these modules may be combined or otherwise re-arranged in various embodiments. In some embodiments, memory 608 may store a subset of the modules and data structures identified above. Furthermore, memory 608 may store additional modules and data structures not described above.

Although FIG. 7 shows a server, FIG. 7 is intended more as functional description of the various features which may be present in a set of servers than as a structural schematic of the embodiments described herein. In practice, and as recognized by those of ordinary skill in the art, items shown separately could be combined and some items could be separated. For example, some items (e.g., email module 720 and email database 721) shown separately in FIG. 7 could be implemented on single servers and single items could be implemented by one or more servers. The actual number of servers used to implement the server system 700 and how features are allocated among them will vary from one implementation to another, and may depend in part on the amount of data traffic that the system must handle during peak usage periods as well as during average usage periods.

Each of the methods described herein may be governed by instructions that are stored in a computer readable storage medium and that are executed by one or more processors of one or more servers. Each of the operations shown in FIGS. 3A-1 to 3A-5 and 3B-1 to 3B2 may correspond to instructions stored in a computer memory or computer readable storage medium.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated.

What is claimed is:

1. A computer-implemented method, comprising:
on a first computer system having one or more processors and memory storing programs executed by the one or more processors;
receiving an email message that is a part of an email thread having a plurality of email messages, wherein the received email message includes a first section containing content encoded as a plain text Multipurpose Internet Mail Extensions ("MIME") type and a second section containing content encoded as a gadget MIME type, wherein the second section includes gadget instructions and associated gadget data; and
in response to user selection of the received email message:
obtaining, using a gadget resident in the content of received email message, updated gadget data, including:
analyzing, using the gadget resident in the received email message, content of the plurality of messages in the email thread;
wherein the gadget is invoked by executing the gadget instructions;
displaying, in body of the email message, the gadget; and
updating, in the body of the email message, the displayed gadget to reflect the obtained updated gadget data.

2. The method of claim 1, wherein:
the instructions corresponding to the gadget comprise a link to a gadget on a second computer server system; and
executing the gadget instructions includes retrieving gadget code referenced by the gadget instructions from the second computer server system.

3. The method of claim 1, wherein the gadget instructions include a gadget instance identifier that is obtained from a second computer system.

4. The method of claim 1, wherein the updated gadget data is aggregated from a gadget MIME type portion of one or more messages in the email thread.

5. The method of claim 1, wherein the updated gadget data is aggregated from plain text contained in one or more messages in the email thread.

6. The method of claim 1, wherein the updated gadget data is obtained from a second computer system remotely located from the first computer system.

7. The method of claim 1, wherein the displaying includes:
determining whether the first computer system is capable of executing gadgets; and
in accordance with a determination that the first computer system is not capable of executing gadgets, displaying plain text corresponding to the display of the gadget updated with updated gadget data.

8. The method of claim 1, wherein only one instance of the gadget is displayed.

9. The method of claim 1, wherein the gadget instructions correspond to a gadget that is collaborative.

10. The method of claim 1, wherein the gadget is selected from one of: voting gadgets, gaming gadgets, calendar gadgets, shipment tracking gadgets and task list gadgets.

11. The method of claim 1, further comprising:
receiving user action with respect to the gadget;
sending an email containing new gadget data to one or more participants in the thread, wherein the new gadget data is in accordance with the received user action; and
wherein the email includes a first section including content encoded as a plain text MIME type and a second portion containing content encoded as a gadget MIME type.

12. The method of claim 1, wherein the gadget instructions are executed in accordance with a determination that the gadget is from a trusted domain.

13. The method of claim 1, wherein the gadget is executed in accordance with a determination that the gadget is received from a sender in an address book associated with a recipient of the email message.

14. The method of claim 1, wherein the gadget is executed in accordance with a determination that the gadget has been approved for execution by a user.

15. A non-transitory computer readable storage medium storing one or more programs configured to be executed by a computer system, the one or more programs comprising instructions for:
receiving an email message that is a part of an email thread having a plurality of email messages, wherein the received email message includes a first section containing content encoded as a plain text Multipurpose Internet Mail Extensions ("MIME") type and a second section containing content encoded as a gadget MIME type, wherein the second section includes gadget instructions and associated gadget data; and
in response to user selection of the received email message:
obtaining, using a gadget resident in the content of received email message, updated gadget data, including:
analyzing, using the gadget resident in the received email message, content of the plurality of messages in the email thread;
wherein the gadget is invoked by executing the gadget instructions;
displaying, in body of the email message, the gadget; and
updating, in the body of the email message, the displayed gadget to reflect the obtained updated gadget data.

16. A system comprising:
one or more processors and memory;
the memory storing one or more programs to be executed by the one or more processors;
one or more programs stored in the memory and configured for execution by the one or more processors, the one or more programs including instruction for:
receiving an email message that is a part of an email thread having a plurality of email messages, wherein the received email message includes a first section containing content encoded as a plain text Multipurpose Internet Mail Extensions ("MIME") type and a second section containing content encoded as a gadget MIME type, wherein the second section includes gadget instructions and associated gadget data; and in response to user selection of the received email message:
  obtaining, using a gadget resident in the content of received email message, updated gadget data, including:
    analyzing, using the gadget resident in the received email message, content of the plurality of messages in the email thread;
  wherein the gadget is invoked by executing the gadget instructions;
  displaying, in body of the email message, the gadget; and
  updating, in the body of the email message, the displayed gadget to reflect the obtained updated gadget data.

\* \* \* \* \*